US011019665B2

(12) United States Patent
Islam et al.

(10) Patent No.: US 11,019,665 B2
(45) Date of Patent: May 25, 2021

(54) MULTIPLE MSG1 FOR PDCCH ORDERED RACH

(71) Applicant: QUALCOMM Incorporated, San Diego, CA (US)

(72) Inventors: Muhammad Nazmul Islam, Edison, NJ (US); Tao Luo, San Diego, CA (US); Wanshi Chen, San Diego, CA (US); Bilal Sadiq, Basking Ridge, NJ (US); Makesh Pravin John Wilson, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/175,811

(22) Filed: Oct. 30, 2018

(65) Prior Publication Data

US 2020/0137806 A1 Apr. 30, 2020

(51) Int. Cl.
*H04W 74/08* (2009.01)
*H04B 7/0408* (2017.01)
(Continued)

(52) U.S. Cl.
CPC ...... *H04W 74/0841* (2013.01); *H04B 7/0408* (2013.01); *H04L 1/0071* (2013.01); *H04L 27/2607* (2013.01); *H04W 74/006* (2013.01)

(58) Field of Classification Search
CPC ............ H04W 74/0841; H04W 74/006; H04B 7/0408; H04L 1/0071; H04L 27/2607
See application file for complete search history.

(56) References Cited

U.S. PATENT DOCUMENTS 9,788,322 B2 * 10/2017 Wong ................. H04W 74/006
2012/0188958 A1 * 7/2012 Suzuki .............. H04W 72/0413
370/329

(Continued)

FOREIGN PATENT DOCUMENTS

WO WO-2018031291 A1 2/2018

OTHER PUBLICATIONS

3rd Generation Partnership Project; Technical Specification Group Radio Access Network; Evolved universial terrestrial Radio Access (E-ultra) and evolved universal terrestrial radio access network (E-Utran); overall description; stage 2 (Release 10), 3GPP Standard; 3GPP TS 36.300, 3rd Generation Partnership Project (3GPP), Mobile competence centre; 650, Route Deslucioles; F-06921 Sophia-Antipolis cedex; France, No. V10.3.0, Mar. 1, 2011 (Mar. 1, 2011), pp. 1-197, XP55135753, section 10.1.5.2; p. 72 -p. 73; figures 10.1.5.2-1.

(Continued)

*Primary Examiner* — Freshteh N Aghdam
(74) *Attorney, Agent, or Firm* — Holland & Hart LLP

(57) ABSTRACT

Methods, systems, and devices for multiple random access channel (RACH) message 1 (Msg1) transmission for physical downlink control channel (PDCCH) ordered RACH are described. A user equipment (UE) may perform the multiple Msg1 transmission as part of a CFRA or CBRA procedure for access. The UE may perform the multiple Msg1 transmissions in a cyclic consecutive manner during configured RACH occasions or according to explicit time and frequency indications of a random access response (RAR) window. Based on the multiple Msg1 transmission procedure, the UE may reduce latency for random access procedure on the RACH and improve signaling throughput. In some cases, the UE may support beam correspondence and may perform multiple Msg1 transmissions to enhance multi- (Continued)

beam diversity during RACH transmission by performing transmission corresponding to RACH occasions mapped to different synchronization signal blocks (SSBs).

18 Claims, 22 Drawing Sheets

(51) Int. Cl.
*H04L 1/00* (2006.01)
*H04L 27/26* (2006.01)
*H04W 74/00* (2009.01)

(56) References Cited

U.S. PATENT DOCUMENTS

| 2013/0136073 A1* | 5/2013 | Kato ..................... H04L 5/001 370/329 |
| 2016/0345271 A1 | 11/2016 | Chen et al. |
| 2019/0069258 A1* | 2/2019 | Jeon ..................... H04W 48/20 |
| 2020/0107358 A1* | 4/2020 | Basu Mallick ... H04W 74/0833 |
| 2020/0137803 A1* | 4/2020 | Fakoorian ............. H04L 5/0055 |
| 2020/0178305 A1* | 6/2020 | Chen ..................... H04L 5/0055 |

OTHER PUBLICATIONS

International Search Report and Written Opinion—PCT/US2019/058269—ISA/EPO—dated Feb. 4, 2020.

Nokia., et al., "NR Random Access Procedure". 3GPP Draft, 3GPP TSG-RAN WG1#88bis, R1-1704943_ NR Random Access Procedure, 3rd Generation Partnership Project (3GPP), Mobile Competence Centre, 650, Route Des Lucioles, F-06921, Sophia-Antipolis Cedex, France, vol. RAN WG1. No. Spokane. USA, Apr. 3, 2017-Apr. 7, 2017, Apr. 2, 2017 (Apr. 2, 2017), XP051243077, 11 pages, Retrieved from the Internet: URL:http://www.3gpp.org/ftp/Meetings_3GPP_SYNC/RAN1/Docs/ [retrieved on Apr. 2, 2017] section 3.1. 4.2. 4.3; figures 1. 3.

* cited by examiner

MULTIPLE MSG1 FOR PDCCH ORDERED RACH

BACKGROUND

The following relates generally to wireless communications, and to multiple Msg1 transmission for physical downlink control channel (PDCCH) ordered random access channel (RACH).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support multiple random access channel (RACH) message 1 (Msg1) transmissions for physical downlink control channel (PDCCH) ordered RACH. Generally, the described techniques provide for multiple Msg1 transmissions at the user equipment (UE) during a random access response (RAR) window (i.e., prior to RAR window expiration). The multiple Msg1 transmissions may improve latency for random access procedure associated with the channel, including for the UEs without beam correspondence. Additionally or alternatively, the multiple Msg1 transmissions may enhance multi-beam diversity, including for the UEs with beam correspondence. As described, the multiple Msg1 transmissions may promote enhancements to operations for at least handover scenarios to reduce latency, beam failure recovery over contention-free random access (CFRA) procedures, physical downlink control channel (PDCCH) ordered RACH following time alignment timer expiration at the UE, and contention based random access (CBRA) procedures for initial access.

A method of wireless communication at a base station is described. The method may include determining a command for a UE to perform random access channel procedure, identifying indicators of a configuration for multiple transmissions of a first type of random access channel message based on the determining, the indicators included in a physical downlink control channel order random access channel procedure, the indicators including time and frequency location information, procedure information, or a combination for the multiple transmissions, and transmitting the indicators to establish the configuration.

An apparatus for wireless communication at a base station is described. The apparatus may include a processor, memory in electronic communication with the processor, and instructions stored in the memory. The instructions may be executable by the processor to cause the apparatus to determine a command for a UE to perform random access channel procedure, identify indicators of a configuration for multiple transmissions of a first type of random access channel message based on the determining, the indicators included in a physical downlink control channel order random access channel procedure, the indicators including time and frequency location information, procedure information, or a combination for the multiple transmissions, and transmit the indicators to establish the configuration.

Another apparatus for wireless communication at a base station is described. The apparatus may include means for determining a command for a UE to perform random access channel procedure, identifying indicators of a configuration for multiple transmissions of a first type of random access channel message based on the determining, the indicators included in a physical downlink control channel order random access channel procedure, the indicators including time and frequency location information, procedure information, or a combination for the multiple transmissions, and transmitting the indicators to establish the configuration.

A non-transitory computer-readable medium storing code for wireless communication at a base station is described. The code may include instructions executable by a processor to determine a command for a UE to perform random access channel procedure, identify indicators of a configuration for multiple transmissions of a first type of random access channel message based on the determining, the indicators included in a physical downlink control channel order random access channel procedure, the indicators including time and frequency location information, procedure information, or a combination for the multiple transmissions, and transmit the indicators to establish the configuration.

In some examples of the method, apparatuses, and non-transitory computer-readable medium described herein, the multiple transmissions of the first type of random access channel message include message 1 transmissions from the UE for the physical downlink control channel order random access channel procedure.

In some examples of the method, apparatuses, and non-transitory computer-readable medium described herein, identifying indicators of the configuration further may include operations, features, means, or instructions for identifying indicators of the configuration for a number of transmissions of the first type of random access channel message for performing the multiple transmissions.

In some examples of the method, apparatuses, and non-transitory computer-readable medium described herein, the multiple transmissions occur in a cyclic consecutive manner during random access channel occasions of the random access response window.

In some examples of the method, apparatuses, and non-transitory computer-readable medium described herein, the cyclic consecutive manner includes message 1 transmissions from the UE in the same random access channel index during random access channel occasions of the random access response window, where the random access channel occasions correspond to consecutive random access channel occasions associated with the same synchronization signal block index or channel state information reference signal index.

In some examples of the method, apparatuses, and non-transitory computer-readable medium described herein, identifying indicators of the configuration further may include operations, features, means, or instructions for determining explicit locations for each transmission of the first type of random access channel message for performing the multiple transmissions during random access channel occasions of the random access response window, and identifying indicators of the configuration for multiple transmissions based on the determining.

Some examples of the method, apparatuses, and non-transitory computer-readable medium described herein may further include operations, features, means, or instructions for identifying indicators of the configuration for a set of bits to indicate random access channel occasion indices for the multiple transmissions during the random access response window.

Some examples of the method, apparatuses, and non-transitory computer-readable medium described herein may further include operations, features, means, or instructions for identifying indicators of the configuration for a first set of the set of bits to indicate a synchronization signal block index, the synchronization signal block index corresponding to random access channel occasions in time during the random access response window.

Some examples of the method, apparatuses, and non-transitory computer-readable medium described herein may further include operations, features, means, or instructions for identifying indicators of the configuration for a second set of the set of bits to indicate a relative random access channel occasion index, the relative random access channel occasion index corresponding to random access channel occasions among a group of random access channel occasions corresponding to a synchronization signal block index.

In some examples of the method, apparatuses, and non-transitory computer-readable medium described herein, the control information may be included as part of downlink control information contents of the physical downlink control channel order, control information included in a medium access control-control element, data included in radio resource control messaging, or a combination.

In some examples of the method, apparatuses, and non-transitory computer-readable medium described herein, transmitting the indicators that include control information further may include operations, features, means, or instructions for indicating the time and frequency location information within the preamble framework of the physical downlink control channel order random access channel procedure.

In some examples of the method, apparatuses, and non-transitory computer-readable medium described herein, transmitting the indicators that include control information further may include operations, features, means, or instructions for transmitting an indication for implementing one or more one or more uplink (UL) transmit beams at the UE as part of an UL transmit beam sweep for the multiple transmissions.

In some examples of the method, apparatuses, and non-transitory computer-readable medium described herein, transmitting the indicators that include control information further may include operations, features, means, or instructions for transmitting an indication via the physical downlink control channel order for performing the multiple transmissions in association with one or more control beams supported by the base station, the one or more control beams associated with different control resource sets and having different timing advance groups.

Some examples of the method, apparatuses, and non-transitory computer-readable medium described herein may further include operations, features, means, or instructions for identifying indicators of the configuration for at least one of a random access channel preamble or random access channel occasion for the multiple transmissions in association with the one or more control beams, and transmitting an indication via the physical downlink control channel order based on the configuring.

Some examples of the method, apparatuses, and non-transitory computer-readable medium described herein may further include operations, features, means, or instructions for identifying indicators of the configuration for an interleaving pattern within the random access response window for random access channel occasions corresponding to one or more synchronization signal block indices and corresponding DL receive beams at the UE.

Some examples of the method, apparatuses, and non-transitory computer-readable medium described herein may further include operations, features, means, or instructions for receiving, from the UE, one or more transmissions of the multiple transmissions during the random access response window, the one or more transmissions received on one or more UL receive beams at the base station, the one or more UL receive beams associated with synchronization signal blocks, and transmitting, based on the receiving, one or more responses to the UE.

In some examples of the method, apparatuses, and non-transitory computer-readable medium described herein, the one or more responses to the UE include random access channel responses for the physical downlink control channel order random access channel procedure.

In some examples of the method, apparatuses, and non-transitory computer-readable medium described herein, the one or more responses each include an UL transmit power command for subsequent transmission of a second type of message from the UE.

In some examples of the method, apparatuses, and non-transitory computer-readable medium described herein, the transmission of the second type of message includes a schedule for a message 3 transmission from the UE for the physical downlink control channel order random access channel procedure.

In some examples of the method, apparatuses, and non-transitory computer-readable medium described herein, receiving the one or more transmissions of the multiple transmissions further may include operations, features, means, or instructions for determining an UL transmit beam at the UE associated with a lowest UL transmit power for the multiple transmissions, the UL transmit beam included as part of an UL transmit beam sweep by the UE, and transmitting an indication to the UE based on the determining, the indication including a notification of the UL transmit beam.

In some examples of the method, apparatuses, and non-transitory computer-readable medium described herein, the UE supports beam correspondence.

A method of wireless communication at a UE is described. The method may include determining to perform random access channel procedure with a base station, receiving control information from the base station as part of a physical downlink control channel order random access channel procedure, the control information including one or more indicators for multiple transmissions of a first type of random access channel message, the one or more indicators including time and frequency location information, procedure information, or a combination for the multiple transmissions, and determining a transmission scheme for the multiple transmissions based on the control information, the multiple transmissions performed by the UE during a random access response window.

An apparatus for wireless communication at a UE is described. The apparatus may include a processor, memory in electronic communication with the processor, and instructions stored in the memory. The instructions may be executable by the processor to cause the apparatus to determine to perform random access channel procedure with a base station, receive control information from the base station as part of a physical downlink control channel order random access channel procedure, the control information including one or more indicators for multiple transmissions of a first type of random access channel message, the one or more indicators including time and frequency location information, procedure information, or a combination for the multiple transmissions, and determine a transmission scheme for the multiple transmissions based on the control information, the multiple transmissions performed by the UE during a random access response window.

Another apparatus for wireless communication at a UE is described. The apparatus may include means for determining to perform random access channel procedure with a base station, receiving control information from the base station as part of a physical downlink control channel order random access channel procedure, the control information including one or more indicators for multiple transmissions of a first type of random access channel message, the one or more indicators including time and frequency location information, procedure information, or a combination for the multiple transmissions, and determining a transmission scheme for the multiple transmissions based on the control information, the multiple transmissions performed by the UE during a random access response window.

A non-transitory computer-readable medium storing code for wireless communication at a UE is described. The code may include instructions executable by a processor to determine to perform random access channel procedure with a base station, receive control information from the base station as part of a physical downlink control channel order random access channel procedure, the control information including one or more indicators for multiple transmissions of a first type of random access channel message, the one or more indicators including time and frequency location information, procedure information, or a combination for the multiple transmissions, and determine a transmission scheme for the multiple transmissions based on the control information, the multiple transmissions performed by the UE during a random access response window.

In some examples of the method, apparatuses, and non-transitory computer-readable medium described herein, the multiple transmissions of the first type of random access channel message include message 1 transmissions to the base station for the physical downlink control channel order random access channel procedure.

In some examples of the method, apparatuses, and non-transitory computer-readable medium described herein, determining the transmission scheme further may include operations, features, means, or instructions for determining a transmission scheme for a number of transmissions of the first type of random access channel message for performing the multiple transmissions.

In some examples of the method, apparatuses, and non-transitory computer-readable medium described herein, the multiple transmissions occur in a cyclic consecutive manner during random access channel occasions of the random access response window.

In some examples of the method, apparatuses, and non-transitory computer-readable medium described herein, the cyclic consecutive manner includes message 1 transmissions from the UE in the same random access channel index during random access channel occasions of the random access response window, where the random access channel occasions correspond to consecutive random access channel occasions associated with the same synchronization signal block index or channel state information reference signal index.

In some examples of the method, apparatuses, and non-transitory computer-readable medium described herein, determining the transmission scheme further may include operations, features, means, or instructions for determining explicit locations for each transmission of the first type of random access channel message for performing the multiple transmissions during random access channel occasions of the random access response window.

Some examples of the method, apparatuses, and non-transitory computer-readable medium described herein may further include operations, features, means, or instructions for identifying a synchronization signal block index for performing the multiple transmissions based on processing the control information, and determining a preamble index and a relative random access channel occasion index within the random access channel occasions corresponding to the synchronization signal block index based on processing the control information.

In some examples of the method, apparatuses, and non-transitory computer-readable medium described herein, the control information may be received as part of downlink control information contents of the physical downlink control channel order, control information included in a medium access control-control element, data included in radio resource control messaging, or a combination.

In some examples of the method, apparatuses, and non-transitory computer-readable medium described herein, receiving the control information further may include operations, features, means, or instructions for receiving an indication for implementing one or more UL transmit beams as part of an UL transmit beam sweep for the multiple transmissions, and determining the one or more UL transmit beams based on the indication.

In some examples of the method, apparatuses, and non-transitory computer-readable medium described herein, receiving the control information further may include operations, features, means, or instructions for receiving an indication via the physical downlink control channel order for performing the multiple transmissions in association with one or more control beams supported by the base station, the one or more control beams associated with different control resource sets and having different timing advance groups.

Some examples of the method, apparatuses, and non-transitory computer-readable medium described herein may further include operations, features, means, or instructions for transmitting, to the base station, one or more transmissions of the multiple transmissions during the random access response window using one or more UL transmit beams at the UE, and receiving, based on the transmitting, one or more responses from the base station.

In some examples of the method, apparatuses, and non-transitory computer-readable medium described herein, the one or more responses from the base station include random access channel responses for the physical downlink control channel order random access channel procedure.

In some examples of the method, apparatuses, and non-transitory computer-readable medium described herein, the one or more responses each include an UL transmit power command for subsequent transmission of a second type of message at the UE.

In some examples of the method, apparatuses, and non-transitory computer-readable medium described herein, the transmission of the second type of message includes a schedule for a message 3 transmission to the base station for the physical downlink control channel order random access channel procedure.

Some examples of the method, apparatuses, and non-transitory computer-readable medium described herein may further include operations, features, means, or instructions for determining one or more synchronization signal blocks that the UE can detect simultaneously on a DL receive beam at the UE, and transmitting, based on the determining, the multiple transmissions during random access channel occasions of the random access response window, the random access channel occasions corresponding to indices of the one or more synchronization signal blocks.

Some examples of the method, apparatuses, and non-transitory computer-readable medium described herein may further include operations, features, means, or instructions for receiving, from the base station, an interleaving pattern within the random access response window for random access channel occasions corresponding to one or more synchronization signal block indices, and transmitting, based on the interleaving pattern, the multiple transmissions during the random access channel occasions, the multiple transmissions corresponding to one or more synchronization signal blocks or channel state information reference signals.

In some examples of the method, apparatuses, and non-transitory computer-readable medium described herein, the UE supports beam correspondence.

A method of wireless communication at a base station is described. The method may include receiving a first type of message for a random access channel procedure from one or more UL transmit beams of a UE as part of multiple transmissions during a random access response window, transmitting, to the UE, one or more random access channel responses based on the receiving, the one or more responses including an UL transmit power command for subsequent transmissions of a second type of message at the UE, and receiving a transmission of the second type of message from the UE based on the transmitting, the second type of message associated with a lowest UL transmit power command included in the one or more responses.

An apparatus for wireless communication at a base station is described. The apparatus may include a processor, memory in electronic communication with the processor, and instructions stored in the memory. The instructions may be executable by the processor to cause the apparatus to receive a first type of message for a random access channel procedure from one or more UL transmit beams of a UE as part of multiple transmissions during a random access response window, transmit, to the UE, one or more random access channel responses based on the receiving, the one or more responses including an UL transmit power command for subsequent transmissions of a second type of message at the UE, and receive a transmission of the second type of message from the UE based on the transmitting, the second type of message associated with a lowest UL transmit power command included in the one or more responses.

Another apparatus for wireless communication at a base station is described. The apparatus may include means for receiving a first type of message for a random access channel procedure from one or more UL transmit beams of a UE as part of multiple transmissions during a random access response window, transmitting, to the UE, one or more random access channel responses based on the receiving, the one or more responses including an UL transmit power command for subsequent transmissions of a second type of message at the UE, and receiving a transmission of the second type of message from the UE based on the transmitting, the second type of message associated with a lowest UL transmit power command included in the one or more responses.

A non-transitory computer-readable medium storing code for wireless communication at a base station is described. The code may include instructions executable by a processor to receive a first type of message for a random access channel procedure from one or more UL transmit beams of a UE as part of multiple transmissions during a random access response window, transmit, to the UE, one or more random access channel responses based on the receiving, the one or more responses including an UL transmit power command for subsequent transmissions of a second type of message at the UE, and receive a transmission of the second type of message from the UE based on the transmitting, the second type of message associated with a lowest UL transmit power command included in the one or more responses.

Some examples of the method, apparatuses, and non-transitory computer-readable medium described herein may further include operations, features, means, or instructions for identifying, based on the receiving, a highest random access channel UL receive power at the base station, the receive power associated with the first type of message from a UL transmit beam of the one or more UL transmit beams as part of the multiple transmissions.

In some examples of the method, apparatuses, and non-transitory computer-readable medium described herein, receiving the first type of message may include operations, features, means, or instructions for receiving a message 1 transmission from the UE for the random access channel procedure.

In some examples of the method, apparatuses, and non-transitory computer-readable medium described herein, the one or more responses from the base station include one or more message 2 responses for the random access channel procedure.

In some examples of the method, apparatuses, and non-transitory computer-readable medium described herein, receiving the transmission of the second type of message may include operations, features, means, or instructions for receiving a message 3 transmission from the UE for the random access channel procedure.

In some examples of the method, apparatuses, and non-transitory computer-readable medium described herein, the random access channel procedure may be a contention-based random access channel procedure.

A method of wireless communication at a UE is described. The method may include transmitting a first type of message for random access channel procedure from one or more UL transmit beams as part of multiple transmissions to a base station during a random access response window, receiving, from the base station, one or more random access channel responses based on the multiple transmissions, the one or more random access channel responses including an UL transmit power command for subsequent transmissions of a second type of message at the UE, selecting a message of the second type of message based on the one or more responses, the message associated with a lowest UL transmit power command included in the one or more responses, and transmitting the message based on the selecting.

An apparatus for wireless communication at a UE is described. The apparatus may include a processor, memory in electronic communication with the processor, and instructions stored in the memory. The instructions may be executable by the processor to cause the apparatus to transmit a first type of message for random access channel procedure from one or more UL transmit beams as part of multiple transmissions to a base station during a random access response window, receive, from the base station, one or more random access channel responses based on the multiple transmissions, the one or more random access channel responses including an UL transmit power command for subsequent transmissions of a second type of message at the UE, select a message of the second type of message based on the one or more responses, the message associated with a lowest UL transmit power command included in the one or more responses, and transmit the message based on the selecting.

Another apparatus for wireless communication at a UE is described. The apparatus may include means for transmitting a first type of message for random access channel procedure from one or more UL transmit beams as part of multiple transmissions to a base station during a random access response window, receiving, from the base station, one or more random access channel responses based on the multiple transmissions, the one or more random access channel responses including an UL transmit power command for subsequent transmissions of a second type of message at the UE, selecting a message of the second type of message based on the one or more responses, the message associated with a lowest UL transmit power command included in the one or more responses, and transmitting the message based on the selecting.

A non-transitory computer-readable medium storing code for wireless communication at a UE is described. The code may include instructions executable by a processor to transmit a first type of message for random access channel procedure from one or more UL transmit beams as part of multiple transmissions to a base station during a random access response window, receive, from the base station, one or more random access channel responses based on the multiple transmissions, the one or more random access channel responses including an UL transmit power command for subsequent transmissions of a second type of message at the UE, select a message of the second type of message based on the one or more responses, the message associated with a lowest UL transmit power command included in the one or more responses, and transmit the message based on the selecting.

In some examples of the method, apparatuses, and non-transitory computer-readable medium described herein, the multiple transmissions may have the same UL transmit power for each of the one or more UL transmit beams.

In some examples of the method, apparatuses, and non-transitory computer-readable medium described herein, the first type of message includes a message 1 for the random access channel procedure.

In some examples of the method, apparatuses, and non-transitory computer-readable medium described herein, receiving the one or more responses from the base station may include operations, features, means, or instructions for receiving one or more message 2 responses for the random access channel procedure.

In some examples of the method, apparatuses, and non-transitory computer-readable medium described herein, the second type of message includes a message 3 for the random access channel procedure.

In some examples of the method, apparatuses, and non-transitory computer-readable medium described herein, the random access channel procedure may be a contention-based random access channel procedure.

DETAILED DESCRIPTION

Figure 1:
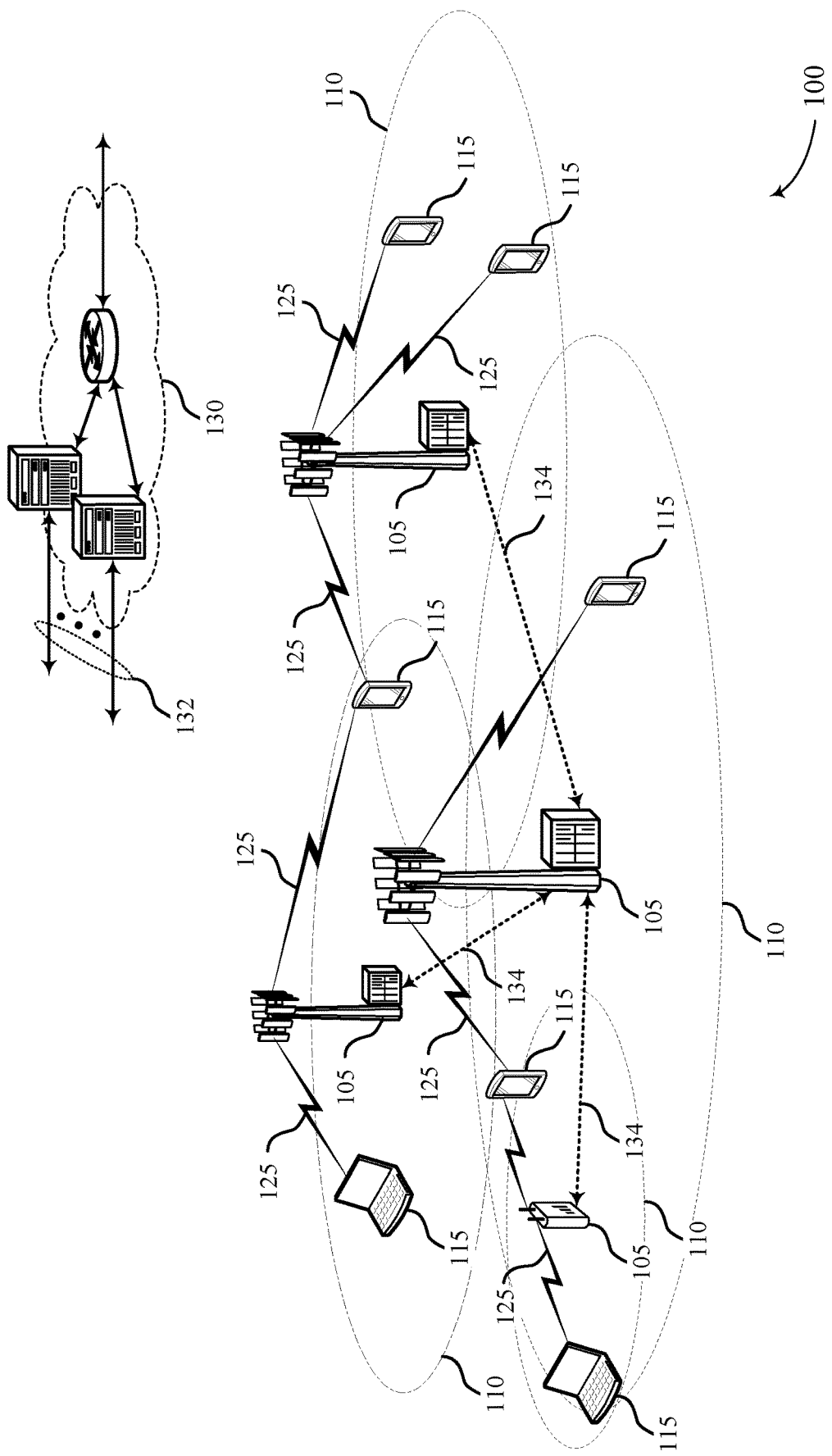
FIG. 1 illustrates an example of a system for wireless communications that supports multiple msg1 for PDCCH ordered RACH in accordance with aspects of the present disclosure.

A user equipment (UE) may determine a set of data resources for transmission and initiate random access procedure for communication with a base station over a random access channel (RACH). The UE may initiate the random access procedure as part of an initial access or connection reestablishment procedure, handover execution, procedure for restoring uplink synchronization due to timing advance expiration, or the like. In some cases, the random access procedure may correspond to a contention-based random access procedure (e.g., CBRA). In other cases, the random access procedure may benefit from reduced latency (e.g., during handover or resumption of downlink traffic for the UE), and the UE may receive an allocated dedicated signature for contention-free random access (e.g., CFRA).

As described, the UE may transmit a plurality of RACH message 1 (Msg1) transmissions as part of a connectivity request. For example, the UE may be capable of multiple Msg1 transmission on transmission opportunities of the RACH using two or more uplink transmit beams. Due, for example, to the orientation of the transmission beams, the base station may receive transmissions sent on some transmission beams but may not receive transmissions on other transmission beams due to signaling distortion and pathloss on the channel. Accordingly, the UE may transmit a first Msg1 connection request on a first transmission beam and subsequently a second Msg1 connection request on a second transmission beam, in the case the base station may not receive transmissions directed from the first transmission beam.

However, transmission of the one or more additional Msg1 transmissions by the UE may be delayed due to configuration of a connection response window which may be, for example, a random access response (RAR) window. The base station may configure the RAR window to include a temporal duration following the Msg1 transmission by the UE, for potential connectivity response (e.g., RACH message 2 (Msg2)) decoding. As configured, transmission opportunities for subsequent multiple Msg1 transmission by the UE may not be present until expiration of the RAR window and a minimum time gap for initiating retransmission. As such, the UE may experience significant latency delays for random access connectivity establishment with the network, particularly in instances where one or more transmit beam paths are not received at the base station.

According to the techniques described herein, the UE may reduce latency for random access procedure on the RACH and improve signaling throughput by performing multiple Msg1 transmissions during transmission opportunities of a configured RAR window. Additionally or alternatively, the multiple Msg1 transmissions may enhance multi-beam diversity during the RAR window, for the UEs with supported beam correspondence.

In some cases, the described benefits may correspond to multiple Msg1 transmissions for physical downlink control channel (PDCCH) ordered RACH, in order to reduce latency for reestablishment of uplink synchronization according to CFRA. For example, the base station may determine a command for the UE to perform RACH procedures. The base station may identify one or more indicators of a configuration for multiple Msg1 transmissions at the UE and include the one or more indicators in a PDCCH order transmitted to the UE. In addition, the PDCCH order may include time and frequency location information, as well as procedure information for performing multiple Msg1 transmissions during a RAR window of the CFRA procedure. The UE may receive the PDCCH order and determine a transmission scheme for multiple Msg1 transmissions during the RAR window using the RACH preamble acquired from the PDCCH order.

In other cases, the described benefits may correspond to multiple Msg 1 transmissions for enhanced beam diversity in connectivity establishment according to CBRA, while minimizing signaling overhead. For example, the UE may initiate a CBRA procedure for initial access to the channel. The UE may not support beam correspondence and may transmit multiple Msg1 transmissions over different uplink transmit beams, to enhance message throughput and promote connectivity establishment. The base station may receive the multiple Msg1 transmissions and transmit corresponding responses (e.g., Msg 2) for connectivity establishment. The Msg2 responses may include uplink transmit power commands for subsequent message (e.g., L2/L3 Msg 3) transmissions at the UE, as part of the CBRA procedure. Based on the received Msg2 responses, the UE may evaluate the contained uplink transmit power commands and select a single Msg3 transmission corresponding to the lowest uplink transmit power, and reducing signaling overhead for subsequent signaling associated with the CBRA procedure.

Aspects of the disclosure are initially described in the context of a wireless communications system. Specific examples are then described of transmission schemes for multiple Msg1 transmissions associated with CFRA and CBRA procedures for random access. Aspects of the disclosure are further illustrated by and described with reference to apparatus diagrams, system diagrams, and flowcharts that relate to multiple Msg1 for PDCCH ordered RACH.

FIG. 1 illustrates an example of a wireless communications system 100 that supports multiple msg1 for PDCCH ordered RACH in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, wireless communications system 100 may include at least one base station 105 and at least one UE 115 that may communicate over a RACH. When the UE 115 has data to transmit over the RACH, the UE 115 may perform RACH procedure with the base station 105, for network synchronization and communication establishment. In some cases, the random access procedure may correspond to a CBRA procedure. In other cases, the random access procedure may benefit from reduced latency (e.g., during handover or resumption of downlink traffic for the UE 115), and the UE 115 may receive an allocated dedicated signature for CFRA procedure. The UE 115 may transmit a first message (e.g., RACH message 1 (Msg1)) containing a RACH preamble. The base station 105 may receive an decode the first message as part of a connection request and transmit a connection response (e.g., RACH message 2 (Msg2)). The connection response may identify resources (e.g., time and frequency resources) for subsequent transmissions (e.g., RACH message 3 (Msg3)).

The base station 105 and the UE 115 may perform the communication during transmission opportunities of a connection response window which may be, for example, a RAR window. The base station 105 may configure the RAR window to include a temporal duration following the Msg1 transmission by the UE 115. In some cases, the UE 115 may benefit from multiple Msg 1 transmission as part of random access procedure.

As described, in some cases, the base station 105 may determine a command for the UE 115 to perform RACH transmission associated with a CFRA procedure as part of a PDCCH ordered RACH. The base station 105 may identify indicators of a configuration for multiple Msg1 transmissions by the UE 115. The base station 105 may include the one or more indicators in a PDCCH order for PDCCH ordered RACH procedure. The indicators may include frequency and location information, as well as procedure information for performing multiple Msg1 transmissions at the UE 115. In some cases, the indicators may include a configuration for performing multiple Msg1 transmissions in a cyclic consecutive manner during consecutive RACH occasions associated with the same SSB index or CSI-RS index. In other cases, the indicators may include explicit locations for performing multiple Msg1 transmissions. The base station 105-a may indicate the time and frequency location information for performing multiple Msg1 transmission procedures at the UE 115 within the preamble framework of the physical downlink control channel order.

In other cases, the base station 105 may receive Msg1 transmissions from one or more uplink transmit beams of the UE 115 as part of a RACH transmission associated with a CBRA procedure. The base station 105 may identify a highest RACH uplink receive power, the receive power associated with received Msg1 transmissions from the one or more uplink transmit beams. In response, base station 105 may transmit one or more RACH responses to the UE 115, the RACH responses including an uplink transmit power command for subsequent RACH message transmissions at the UE 115. Based on the transmissions, the base station 105 may receive a single Msg3 transmission from the UE 115 associated with a lowest uplink transmit power command included in the one or more RACH responses.

As described, in some cases, the UE 115 may determine to perform RACH procedures with the base station 105, and receive control information as part of a PDCCH ordered RACH procedure. The received control information may include one or more indicators for multiple Msg1 transmissions during a configured RAR window. The indicators may include time and frequency location information, as well as procedure information for transmitting the multiple Msg1 transmissions. In some cases, the indicators may include a configuration for performing multiple Msg1 transmissions in a cyclic consecutive manner during consecutive RACH occasions associated with the same SSB index or CSI-RS index. In other cases, the indicators may include explicit locations for performing multiple Msg1 transmissions.

Based on the received control information, the UE 115 may determine a transmission scheme for the multiple Msg1 transmissions during the configured RAR window. The UE 115 may then perform multiple Msg1 transmissions according to the determined transmission scheme and using one or more uplink transmit beams. In response to the transmitting, the UE 115 may receive one or more RACH responses from the base station as part of the PDDCH ordered RACH.

In other cases, the UE 115 may transmit multiple Msg1 transmissions to the base station 105 from one or more uplink transmit beams as part of a RACH transmission associated with a CBRA procedure. In response, the UE 115 may receive one or more RACH responses from the base station 105, the RACH responses including an uplink transmit power command for subsequent RACH message transmissions at the UE 115. Based on the received RACH responses, the UE 115 may select a Msg3 transmission associated with the lowest uplink transmit power command included in the one or more RACH responses. The UE 115 may then transmit the selected message to the base station 105 on a single uplink transmit beam.

Figure 2:
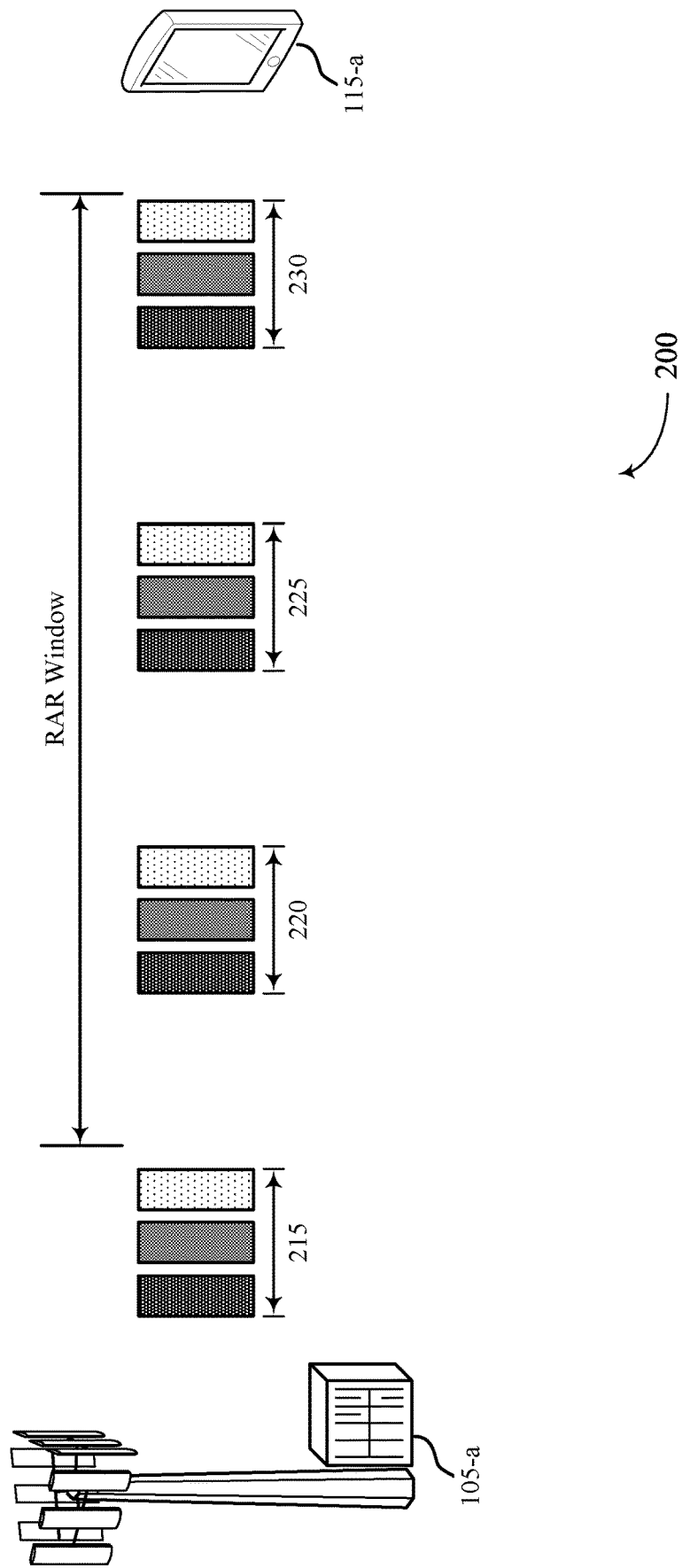
FIG. 2 illustrates an example of a wireless communications system that supports multiple msg1 for PDCCH ordered RACH in accordance with aspects of the present disclosure.

FIG. 2 illustrates an example of a wireless communications system 200 that supports multiple msg1 for PDCCH ordered RACH in accordance with aspects of the present disclosure. Wireless communications system 200 may implement aspects of wireless communications system 100 and may include a base station 105-a and a UE 115-a, as described with reference to FIG. 1.

The UE 115-a may establish communication with the base station 105-a over the RACH according to a random access procedure. As described, the UE 115-a may transmit a connection request to the base station 105-a. The connection request may be a RACH request included in a random access preamble transmission such as a RACH message 1 (Msg1). The base station 105-a may receive and decode the connection request, and prepare a connection response as part of a RACH message 2 (Msg2). Msg2 may include one or more information indications containing uplink transmit power commands and scheduling for subsequent random access signaling (e.g., L2/L3 signaling for RACH message 3 (Msg3)). Msg2 may include an indication of resources for the UE 115-a for transmission over the RACH. The resources may be time and frequency resources. The UE 115-a may utilize the indicated resources to transmit uplink data, which may be a radio resource control (RRC) message included in Msg3.

The UE 115-a may transmit a first Msg1 transmission to the base station 105-a during a RACH occasion of a first transmit opportunity 215. Transmit opportunity 215 may contain a set of RACH occasions each spanning time and frequency resources of the transmit opportunity 215, and corresponding to synchronization signal block (SSB) indices associated with the base station 105-a. In some cases, the base station 105-a may not receive the first Msg1 transmission or may be unable to decode the Msg1 transmission upon reception (e.g., due to channel interference or the use of a transmission beam misaligned with the reception beams at the base station 105-a). In other cases, a response indication to the first Msg1 transmission (e.g., Msg2 transmission) may be delayed, or pathloss may occur prior to reception at the UE 115-a.

The UE 115-a may use a connection response window to address the possibility of non-reception or response delay at the base station 105-a. In some cases, the connection response window may be a RAR window tracked using a RAR window counter. The RAR window may be configured via a master information block (MIB), remaining minimum system information (RMSI), open system interconnection (OSI), downlink control information (DCI), other system information, a RRC message, a handover message, or a combination. In other examples, the RAR window may correspond to a number of available resources (e.g., resources for CFRA).

In order to reduce latency associated with performing the random access procedure, the UE 115-a may transmit multiple Msg1 transmissions within transmit opportunity instances of the RAR window. For example, the UE 115-a may be capable of transmitting on multiple transmission beams and may transmit additional Msg1 connectivity requests within transmission opportunities 220, 225, and 230 of the RAR window using additional transmission beams. Msg1 transmissions over the multiple transmission opportunities of the RAR window may reduce latency for completing random access procedure, particularly for the UE 115-a without beam correspondence.

In some cases, the multiple Msg1 transmissions may be associated with a CFRA procedure as part of a PDCCH ordered RACH. The base station 105-a may determine a command for the UE 115-a to perform RACH procedure. For example, each of the base station 105-a and the UE 115-a may determine a time alignment timer of the UE 115-a has expired, resulting in a loss of uplink synchronization at the UE 115-a. Based on the determining, the base station 105-a may then identify one or more indicators of a configuration for performing multiple Msg1 transmissions at the UE 115-a, including time and frequency location information or procedure information for performing connectivity request.

The base station 105-*a* may configure one or more bit indications within control information (e.g., DCI) of a PDCCH order as part of identifying indicators of the configuration. The base station 105-*a* may format the PDDCH order according to a DCI format (e.g., DCI 1A format) that includes a preamble index for performing CFRA procedure. The base station 105-*a* may configure the PDCCH order to include one or more bit indications of an SSB index and relative RACH occasion indices for indicating RACH occasions of the one or more transmit opportunities 220, 225, and 230, for multiple Msg1 transmissions. Additionally, the base station 105-*a* may configure bit contents of the PDCCH order to enable multiple Msg1 transmissions and indicate the number of consecutive Msg1 transmissions the UE 115-*a* may transmit based on the PDCCH order. In some cases, the base station 105-*a* may indicate the time and frequency location parameters using the same preamble index and relative RACH occasions corresponding to a single SSB and relative RACH index, for the UE 115-*a* to perform the multiple Msg1 transmissions in a cyclic consecutive manner during the RACH occasions. In other cases, the base station 105-*a* may determine explicit time and frequency location parameters for each Msg1 transmission opportunity. The explicit time and frequency location parameters may correspond to one or more relative RACH occasion index values for an SSB index associated with the RACH occasions of the transmit opportunities.

In some cases, the base station 105-*a* may communicate with the UE 115-*a* according to multiple control beams corresponding to different control resource sets (CORESETs) within the system bandwidth. The multiple control beams may have different delay spreads and accordingly be associated with variant timing advance groups. As part of the PDDCH controlled RACH, the base station 105-*a* may configure the PDCCH order to include indication for performing Msg1 transmissions at the UE 115-*a* for each of the supported control beams. The configuration may include indication of RACH preambles and time and frequency scheduling indications for performing the multiple Msg1 transmissions within the available RACH occasions in accordance with the multiple configured CORESETs.

The base station 105-*a* may then transmit the PDDCH order to the UE 115-*a* as part of the CFRA procedure. The PDCCH order may include one or more indicators within the formatted DCI for the UE 115-*a* to perform the multiple Msg1 transmissions during the configured RAR window of the RACH. Additionally, the base station 105-*a* may indicate to the UE 115-*a*, either via the DCI of the PDDCH order or independently through MAC-CE or RRC signaling, to use different uplink transmit beams as part of a beam sweep for performing the multiple Msg1 transmissions. By promoting beam diversity through transmission across multiple transmit beams supported by the UE 115-*a*, the base station 105-*a* may determine the best uplink transmit beam via the received signaling and can inform the UE accordingly.

The UE 115-*a* may receive the PDCCH order transmission provided by the base station 105-*a* and process the formatted DCI indications for performing multiple Msg1 transmissions within the configured RAR window following transmit opportunity 215. In some cases, the UE 115-*a* may process one or more indicators for performing multiple Msg1 transmissions in a cyclic consecutive manner within the indicated RACH occasions and preamble indices provided in the PDCCH order. In other cases, the UE 115-*a* may identify one or more explicit time and frequency location indications for performing multiple Msg1 transmissions within the indicated RACH occasions. The UE 115-*a* may then perform multiple Msg1 transmissions within the RACH occasions of the RAR window based on the command information of the PDCCH order.

In other cases, the multiple Msg1 transmissions may be associated with a CBRA procedure as part of an initial network access or connectivity reestablishment (e.g., RRC connectivity reestablishment) procedure. For example, the UE 115-*a* may transmit multiple Msg1 transmissions on RACH occasions of the set of uplink transmit opportunities 215, 220, 225, and 230. The UE 115-*a* may transmit the multiple Msg1 transmissions via different uplink transmit beams to increase transmit diversity and improve message throughput on the channel. As detailed, in some cases the UE 115-*a* may transmit the multiple Msg1 transmissions in a cyclic consecutive manner according to the same relative RACH index for each RACH occasion. In other cases, the UE 115-*a* may transmit the multiple Msg1 transmissions according to pre-specified rules for transmission on variant resources within the RACH occasions. The multiple Msg1 transmissions may support the same uplink transmit power for each of the different uplink transmit beams.

The base station 105-*a* may receive the multiple Msg1 transmissions for performing CBRA and measure the RACH receive power associated with the Msg1 transmissions from the different uplink receive beams of the UE 115-*a*. The base station 105-*a* may then configure Msg2 responses for each of the received Msg1 transmissions of the RACH occasions based on the reception. The Msg2 responses may include uplink transmit power commands for subsequent RACH signaling on the corresponding uplink transmit beams. The uplink transmit power commands may be based on the measured RACH receive power of the multiple Msg1 transmissions. For example, the base station 105-*a* may identify the uplink transmit beam associated with the Msg1 transmission having the highest PRACH receive power. The base station 105-*a* may then configure a lowest uplink transmit power command for the respective uplink transmit beam. Following the configuration, the base station 105-*a* may transmit the Msg2 responses for the multiple Msg1 transmissions to the UE 115-*a* for subsequent signaling procedure associated with performing the CBRA.

The UE 115-*a* may receive the multiple Msg2 responses and process the contained uplink transmit power commands for performing subsequent message (e.g., L2/L3 Msg 3) transmission at the UE. For example, the UE 115-*a* may evaluate the received Msg2 responses and determine the Msg2 response containing the lowest uplink transmit power command (i.e., the Msg2 response to the Msg1 transmission with the highest PRACH receive power). Based on the determination, the UE 115-*a* may then select the Msg2 response containing the lowest uplink transmit power command and perform single Msg3 transmission on the associated uplink transmit beam in accordance with the contained transmit power command. By performing a single Msg3 transmission, the UE 115-*a* may reduce signaling overhead associated with performing CBRA procedure while enhancing signaling diversity to determine the best uplink transmit beam for completing CBRA.

As described, each of the procedures for performing multiple Msg1 transmissions for RACH procedure may reduce latency for connectivity establishment and, in the case of CBRA, reduce messaging overhead. Additionally or alternatively, the UE 115-*a* may support beam correspondence and perform multiple Msg1 transmissions for enhanced beam diversity during RACH procedure. For example, the UE 115-*a* may obtain multi-beam diversity by transmitting multiple Msg1 transmissions corresponding to RACH occasions associated with multiple SSB indices. In some cases, the UE 115-*a* may support beam correspondence and implement multiple uplink transmit beams for performing multiple Msg1 transmissions on RACH occasions corresponding to the different SSB indices. As part of the supported beam correspondence, the UE 115-*a* may evaluate the SSBs associated with the indices of the multiple Msg1 transmissions with appropriate reception beams for receiving Msg2 responses from the base station 105-*a*. The UE 115-*a* may evaluate the SSBs for Msg2 reception based on an interleaving pattern configured by the network. In other cases, the UE 115-*a* may be capable of monitoring multiple SSBs on a single downlink reception beam and may transmit multiple Msg1 transmissions corresponding to different SSB indices via the same uplink transmit beam (i.e., the UE 115-*a* may transmit multiple Msg1 corresponding to the set of SSBs the UE 115-*a* is capable of detecting simultaneously on the RACH).

Following expiration of the RAR window, the UE 115-*a* may pause Msg1 transmissions for a configured delay gap prior. Following the configured delay gap, the UE 115-*a* may initiate Msg1 retransmissions as part of a CFRA or CBRA procedure on the RACH. In some cases, the Msg1 retransmissions may be associated with performing random access procedure on RACH occasions associated with an SSB index disparate from the RACH occasions of the multiple Msg1 transmissions of the RAR window. In some cases, the UE 115-*a* may perform the Msg1 retransmissions as part of a multiple Msg1 transmissions scheme for accessing the RACH.

Figure 3:
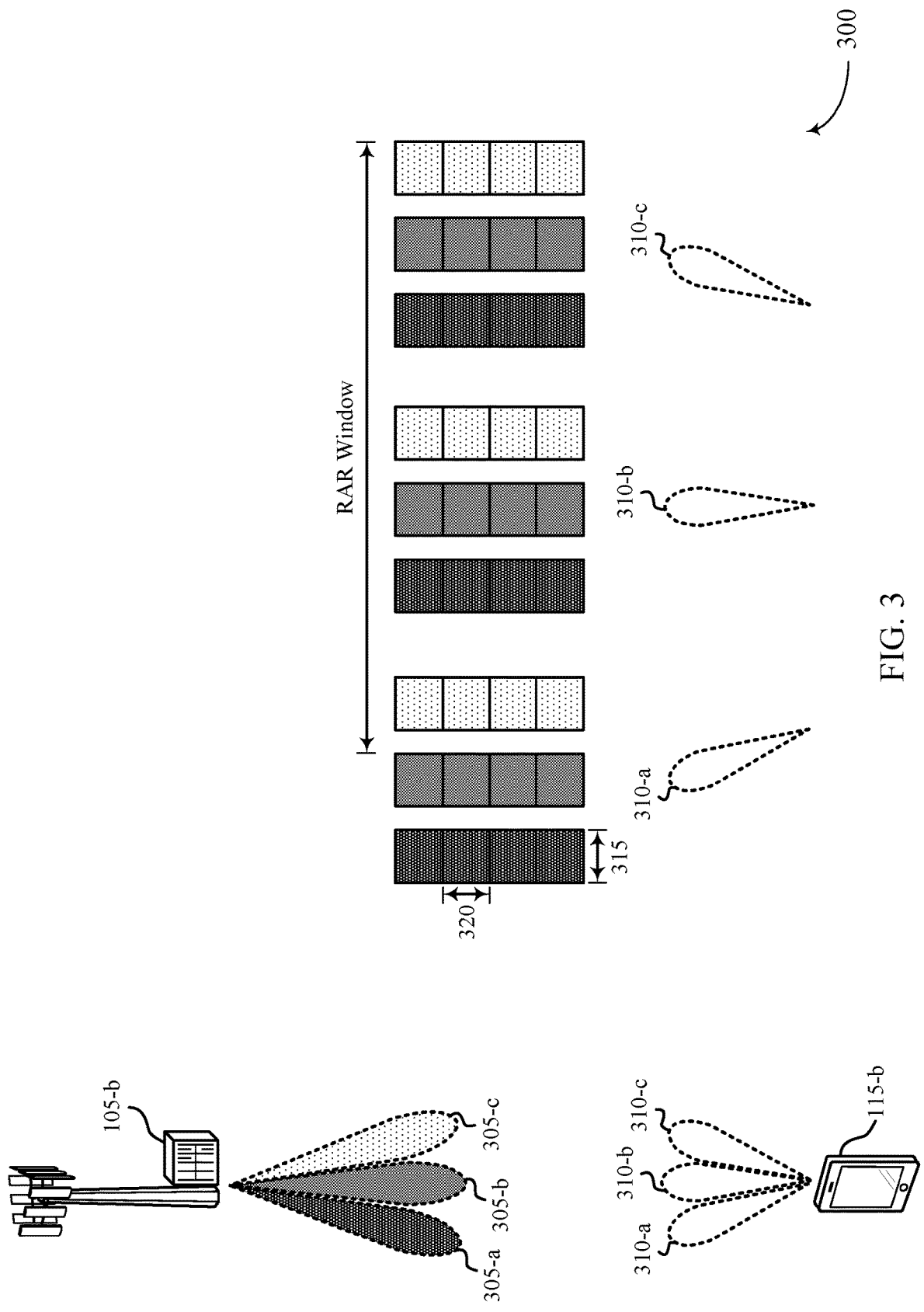
FIG. 3 illustrates an example of a signal exchange that supports multiple msg1 for PDCCH ordered RACH in accordance with aspects of the present disclosure.

FIG. 3 illustrates an example of a signal exchange 300 that supports multiple msg1 for PDCCH ordered RACH in accordance with aspects of the present disclosure. Signal exchange 300 may be associated with a communication exchange between a base station 105-*b* and a UE 115-*b*, which be examples of one or more the base stations 105 or the UEs 115, described with reference to FIGS. 1 and 2.

Signal exchange 300 shows communications between the base station 105-*b* and the UE 115-*b* for CFRA procedure as part of a PDCCH ordered RACH. The base station 105-*b* may be capable of downlink transmission according to multiple downlink transmit beams 305, as part of a beam sweeping procedure. Each of the downlink transmit beams 305 may be associated with a SSB, for transmitting one or more SSBs in distinct directions according to the beam sweep. Each SSB associated with the transmit beams 305 may be mapped to a RACH occasion 315 within the time domain on resources of the RACH. Additionally, each RACH occasion 315 may contain one or more relative RACH occasions 320 in frequency, meaning each SSB may be mapped to one or more consecutive relative RACH occasions 320.

The UE 115-*b* may be capable of transmitting uplink signaling on one or more uplink transmit beams 310, as part of an uplink transmit beam sweep for PDCCH ordered multiple Msg1 transmissions. The UE 115-*b* may perform uplink beam sweep over the one or more uplink transmit beams 310 to reduce latency for CFRA procedure on the RACH and improve signaling throughput by performing multiple Msg1 transmissions during transmission opportunities of the configured RAR window. Accordingly, each of the base station 105-*b* and the UE 115-*b* may support associated receive beams for beamformed communication in relation to the transmit beams 305 and 310.

The signal exchange 300 may include a plurality of transmission opportunities containing multiple RACH occasions mapped according to SSBs of the base station 105-*b*. During each of the transmission opportunities the UE 115-*b* may receive signaling indication from the base station 105-*b* and perform uplink transmissions according to a configured RACH occasion using a single uplink transmit beam 310. In some cases, the UE 115-*b* may use a different uplink transmit beam 310 in consecutive transmission opportunities. In other cases, the UE 115-*b* may use the same uplink transmit beam 310 in consecutive transmission opportunities. The base station 105-*b* may cycle through each of the supported downlink transmit beams 305 during a transmission opportunity. Alternatively, the base station 105-*b* may be capable of receiving on a single reception beam and may use a single transmission beam 305 during each transmission opportunity. The one or more transmission opportunities may span at least a portion of the configured RAR window.

As part of the PDCCH ordered RACH procedure via CFRA, each of the base station 105-*b* and the UE 115-*b* may determine a time alignment timer of the UE 115-*b* has expired, resulting in a loss of uplink synchronization at the UE 115-*b*. Based on the determining, the base station 105-*b* may then identify one or more indicators of a configuration for performing multiple Msg1 transmissions at the UE 115-*b*, including time and frequency location information or procedure information for performing connectivity request. For example, the base station 105-*b* may configure one or more bit indications within control information (e.g., DCI) of a PDCCH order as part of identifying indicators of the configuration. The base station 105-*b* may format the PDDCH order according to a DCI format (e.g., DCI 1A format) that includes a preamble index for performing CFRA procedure. The base station 105-*b* may configure the PDCCH order to include one or more bit indications of an SSB index and relative RACH occasion indices for indicating RACH occasions for multiple Msg1 transmissions. Additionally, the base station 105-*b* may configure bit contents of the PDCCH order to enable multiple Msg1 transmissions and indicate the number of consecutive Msg1 transmissions the UE 115-*b* may transmit based on the PDCCH order, to improve the link budget through non-coherent combining. In some cases, the base station 105-*b* may indicate the time and frequency location parameters using the same preamble index and relative RACH occasions corresponding to a single SSB and relative RACH index, for the UE 115-*b* to perform the multiple Msg1 transmissions in a cyclic consecutive manner during the RACH occasions. In other cases, the base station 105-*b* may determine explicit time and frequency location parameters for each Msg1 transmission opportunity. The explicit time and frequency location parameters may correspond to one or more relative RACH occasion index values for an SSB index associated with the RACH occasions of the transmit opportunities.

In some cases, the base station 105-*b* may communicate with the UE 115-*b* according to multiple control beams corresponding to different control resource sets (CORESETs) within the system bandwidth. The multiple control beams may have different delay spreads and accordingly be associated with variant timing advance groups. As part of the PDDCH controlled RACH, the base station 105-*b* may configure the PDCCH order to include indication for performing Msg1 transmissions at the UE 115-*b* for each of the supported control beams. The configuration may include indication of RACH preambles and time and frequency scheduling indications for performing the multiple Msg1 transmissions within the available RACH occasions in accordance with the multiple configured CORESETs.

The base station 105-*b* may then perform directional transmission over a transmit beam 305 to transmit the PDDCH order to the UE 115-*b*, as part of the CFRA procedure. The PDCCH order may include one or more indicators within the formatted DCI for the UE 115-*b* to perform the multiple Msg1 transmissions during the configured RAR window of the RACH. Additionally, the base station 105-*b* may indicate to the UE 115-*b*, either via the DCI of the PDDCH order or independently through MAC-CE or RRC signaling, to use different uplink transmit beams 310 as part of a beam sweep for performing the multiple Msg1 transmissions.

The UE 115-*b* may receive the PDCCH order and process the included control information for performing communication exchange with the base station 105-*b* as part of the CFRA procedure, including multiple Msg1 transmissions and listening for Msg2 responses over the RACH. The UE 115-*b* may expect that the demodulation reference signal (DMRS) allocation of the received PDCCH order and potential Msg2 responses are quasi-co-located (QCLed) with the same SSB or channel state information reference signal (CSI-RS). As such, a SSB or CSI-RS that is QCLed with both the DM-RS of the PDCCH order and the DM-RS of the corresponding Msg2 response may provide indication for pathloss estimation associated with Msg1 transmissions at the UE 115-*b*.

The UE 115-*b* may process the one or more formatted DCI indications of the control information for determining a transmission scheme for performing the multiple Msg1 transmissions over the RAR window (i.e., following a minimum delay gap). Specifically, the UE 115-*b* may be configured to follow a mapping rule for processing the bit indications associated with an SSB index and relative RACH occasion indices for determining specific RACH locations for multiple Msg1 transmissions via one or more uplink transmit beams 310.

In some cases, the UE 115-*b* may process the PDCCH order and determine time and frequency location parameters corresponding to a single SSB and relative RACH index, for performing cyclic consecutive multiple Msg1 transmissions during the associated RACH occasions. The UE 115-*b* may process the PDDCH order and determine a transmission scheme for performing multiple Msg1 transmissions using the same preamble index and relative RACH occasion for each RACH occasion corresponding to the SSB index value configured within the PDCCH control order. For example, the UE 115-*b* may process the formatted DCI indications of the received PDCCH order and determine a SSB index value associated with the SSB corresponding to downlink transmit beam 305-*b*. The UE 115-*b* may further determine a preamble index and relative RACH occasion index in frequency (e.g., index value 2) for performing the multiple Msg1 transmissions based on the control information of the PDCCH control order. Additionally, the UE 115-*b* may process the PDCCH content of the PDCCH order and determine a number of consecutive number of PDCCH ordered Msg1 transmissions to transmit as part of the transmission scheme.

Based on the determination, the UE 115-*b* may then perform multiple Msg1 transmissions during the RACH occasions corresponding to the mapping of the SSB associated with downlink transmit beam 305-*b* and the indicated relative RACH occasion index, and based on the number of configured consecutive PDCCH ordered Msg1 transmissions. Specifically, the UE 115-*b* may perform Msg1 transmissions during a first RACH occasion (i.e., associated with the indicated SSB index and relative RACH occasion index) via transmit beam 310-*a* and listen for Msg2 responses on the appropriate receive beam. The UE 115-*b* may then perform subsequent Msg1 transmissions via transmit beam 310-*b* during the RAR window, at a second transmission opportunity. The subsequent Msg1 transmissions may be during a second RACH occasion associated with the same SSB index and relative RACH occasion index. The UE 115-*b* may then perform subsequent Msg1 transmissions during a third RACH occasion index associated with the same SSB index and relative RACH occasion index via transmit beam 310-*c*, and listen for Msg2 response. The UE 115-*b* may perform the Msg1 transmissions consecutively based on the number of configured consecutive transmissions provided in the PDCCH control order.

In other cases, the UE 115-*b* may process the PDCCH order and determine explicit time and frequency location parameters for performing multiple Msg1 transmissions. The explicit time and frequency location parameters may include an indication of a single SSB index and one or more relative RACH occasion indices in frequency for performing modulated multiple Msg1 transmissions on different RACH occasions associated with the indicated SSB index value. For example, the UE 115-*b* may process the formatted DCI indications of the received PDCCH order and determine a SSB index value associated with the SSB corresponding to downlink transmit beam 305-*b*. The UE 115-*b* may further determine a preamble index and relative RACH occasion indices in frequency for performing the multiple Msg1 transmissions based on the control information of the PDCCH control order.

Based on the determination, the UE 115-*b* may then perform multiple Msg1 transmissions during the RACH occasions corresponding to the mapping of the SSB associated with downlink transmit beam 305-*b* and the indicated relative RACH occasion indices, and as part of the explicit parameterization indication. Specifically, the UE 115-*b* may transmit a first Msg1 via transmit beam 310-*a* during a first transmission opportunity on a RACH occasion associated with the SSB index and a first relative RACH occasion index (e.g., index value 1). The UE 115-*b* may transmit a second Msg1 via transmit beam 310-*b* during the RAR window at a second transmission opportunity. The UE 115-*b* may transmit the second Msg1 at a second RACH occasion associated with the SSB index and a second relative RACH occasion index (e.g., index value 2). The UE 115-*b* may then transmit a third Msg1 via transmit beam 310-*c* during a third RACH occasion associated with the SSB index and a third relative RACH occasion index (e.g., index value 3). The UE 115-*b* may map the multiple Msg1 transmissions according to the explicit time and frequency parameterizations of the PDCCH control order. In some cases, the UE 115-*b* may shift the relative RACH occasion index for performing multiple Msg1 transmissions according to one or more pre-specified rules (e.g., a cyclic manner iterating the relative RACH occasion index for performing multiple Msg1 transmissions on the RACH occasions corresponding to the indicated SSB index value).

As described, in some cases, the base station 105-*b* may communicate with the UE 115-*b* according to multiple control beams corresponding to different control resource sets (CORESETs) within the system bandwidth. The multiple control beams may have different delay spreads and accordingly be associated with variant timing advance groups. The base station 105-*b* may inform the UE 115-*b* to perform Msg1 transmissions for each supported control beam within the PDCCH control order. The UE 115-*b* may process the control indication of the PDCCH order for determining the RACH preambles and occasions for the multiple control beams supported by the base station 105-b, and perform multiple Msg1 transmissions for the multiple control beams.

Figure 4:
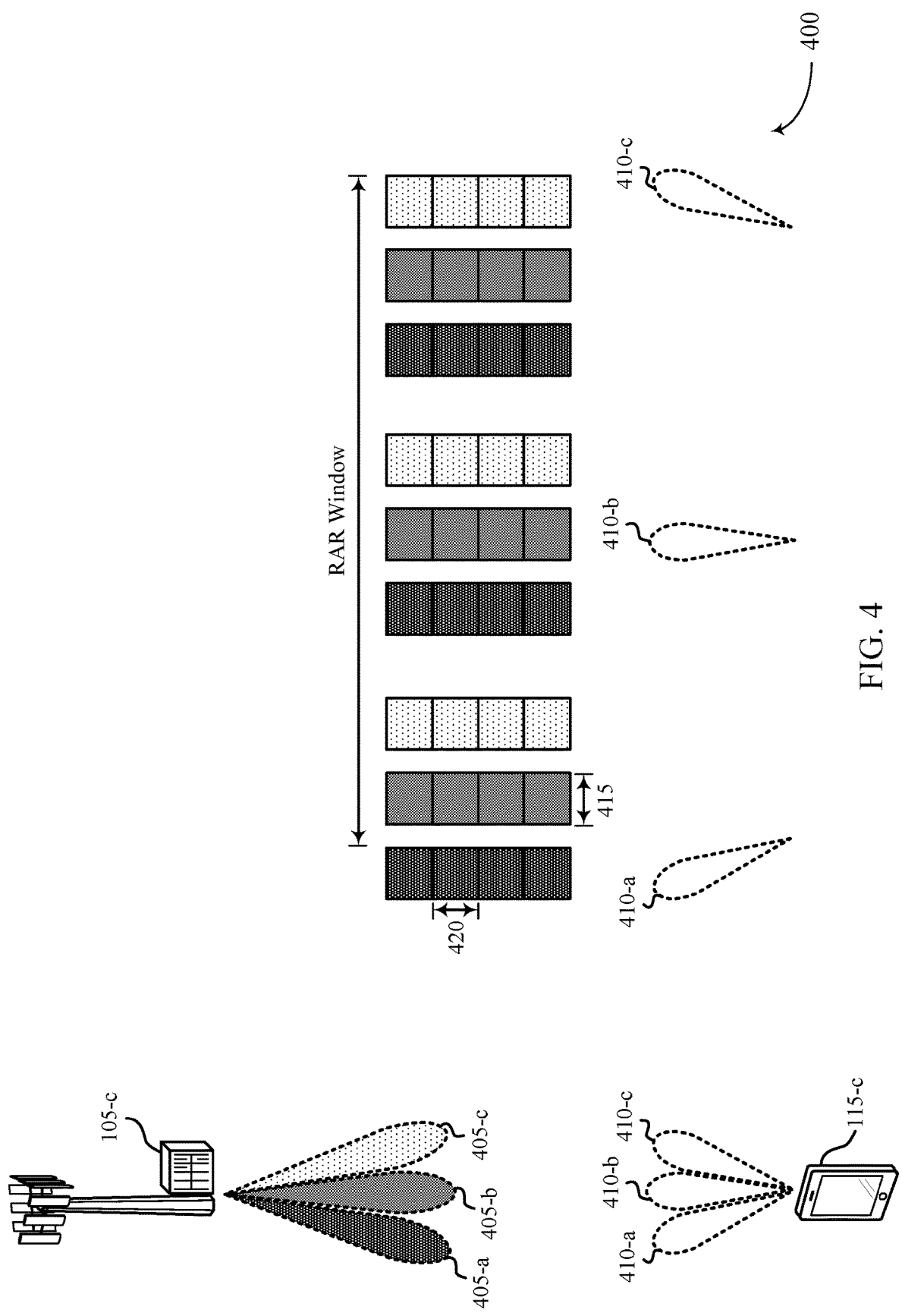
FIG. 4 illustrates an example of a signal exchange that supports multiple msg1 for PDCCH ordered RACH in accordance with aspects of the present disclosure.

FIG. 4 illustrates an example of a signal exchange 400 that supports multiple Msg1 for PDCCH ordered RACH in accordance with aspects of the present disclosure. Signal exchange 400 may be associated with a communication exchange between a base station 105-c and a UE 115-c, which be examples of one or more the base stations 105 or the UEs 115, described with reference to FIGS. 1 through 3.

Signal exchange 400 shows communications between the base station 105-c and the UE 115-c for CFRA procedure as part of a PDCCH ordered RACH. The base station 105-c may be capable of downlink transmission according to multiple downlink transmit beams 405, as part of a beam sweeping procedure. Each of the downlink transmit beams 405 may be associated with a SSB, for transmitting one or more SSBs in distinct directions according to the beam sweep. Each SSB associated with the transmit beams 405 may be mapped to a RACH occasion 415 within the time domain on resources of the RACH. Additionally, each RACH occasion 415 may contain one or more relative RACH occasions 420 in frequency, meaning each SSB may be mapped to one or more consecutive relative RACH occasions 420.

The UE 115-c may be capable of transmitting uplink signaling on one or more uplink transmit beams 410, as part of an uplink transmit beam sweep for PDCCH ordered multiple Msg1 transmissions. The UE 115-c may perform uplink beam sweep over the one or more uplink transmit beams 410 to enhance multi-beam diversity during the RAR window, for the UEs with supported beam correspondence. Accordingly, each of the base station 105-c and the UE 115-c may support associated receive beams for beamformed communication in relation to the transmit beams 405 and 410.

The signal exchange 400 may include a plurality of transmission opportunities containing multiple RACH occasions mapped according to SSBs of the base station 105-c. During each of the transmission opportunities the UE 115-c may receive signaling indication from the base station 105-c and perform uplink transmission according to a configured RACH occasion using a single uplink transmit beam 410. In some cases, the UE 115-c may use a different uplink transmit beam 410 in consecutive transmission opportunities. In other cases, the UE 115-c may use the same uplink transmit beam 410 in consecutive transmission opportunities. The base station 105-c may cycle through each of the supported downlink transmit beams 405 during a transmission opportunity. Alternatively, the base station 105-c may be capable of receiving on a single reception beam and may use a single transmission beam 405 during each transmission opportunity. The one or more transmission opportunities may span at least a portion of the configured RAR window.

As described, the UE 115-c may support beam correspondence and may obtain multi-beam diversity during RACH transmission and performing multiple Msg1 transmissions on RACH occasions corresponding to different SSB or CSI-RS index values. As part of the supported beam correspondence, the UE 115-c may use different uplink transmit beams 410 to transmit the multiple Msg1 transmissions corresponding to different SSBs. The transmission scheme for multiple Msg1 transmissions with supported beam correspondence may be non-overlapped within the RAR window. As part of the transmission scheme associated with the beam correspondence, the base station 105-c may configure an interleaving pattern for the UE 115-c to listen for Msg2 responses on the appropriate SSBs.

For example, the UE 115-c may transmit a first Msg1 via transmit beam 410-a on a RACH occasion corresponding to time resources of a SSB index value associated with a first SSB corresponding to downlink transmit beam 405-a. Based on the configured interleaving pattern provided by the base station 105-c, the UE 115-c may listen for Msg2 responses on a reception beam corresponding to the first SSB. The UE 115-c may transmit a second Msg1 via transmit beam 410-b on a consecutive RACH occasion of the following transmit opportunity, the RACH occasion corresponding to time resources associated with a second SSB corresponding to downlink transmit beam 405-b. Based on the interleaving pattern, the UE 115-c may interleave the reception beams corresponding to the first and second SSB following transmission of the second Msg1. The UE 115-c may then transmit a third Msg1 via transmit beam 410-c on a RACH occasion of the following transmit opportunity, the RACH occasion corresponding to time resources associated with a third SSB corresponding to downlink transmit beam 405-c. Based on the interleaving pattern, the UE 115-c may interleave reception beams corresponding to the first, second, and third SSB following transmission of the third Msg1. The UE 115-c may continue the multiple Msg1 transmissions and reception beam interleaving according to the provided interleaving pattern and based on the number of Msg1 transmissions configured within the RAR window.

Figure 5:
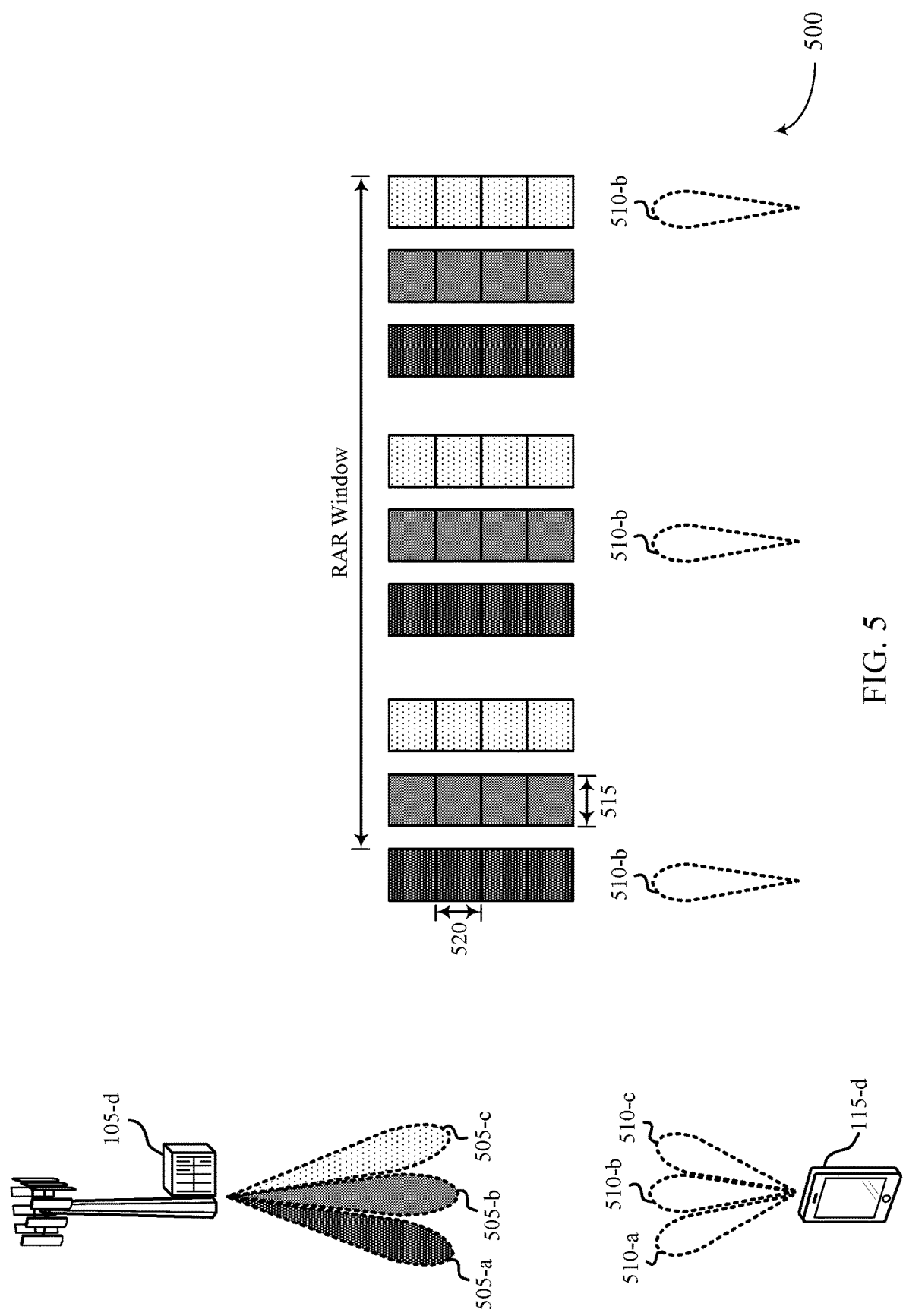
FIG. 5 illustrates an example of a signal exchange that supports multiple msg1 for PDCCH ordered RACH in accordance with aspects of the present disclosure.

FIG. 5 illustrates an example of a signal exchange 500 that supports multiple Msg1 for PDCCH ordered RACH in accordance with aspects of the present disclosure. Signal exchange 500 may be associated with a communication exchange between a base station 105-d and a UE 115-d, which be examples of one or more the base stations 105 or the UEs 115, described with reference to FIGS. 1 through 4.

Signal exchange 500 shows communications between the base station 105-d and the UE 115-d for CFRA procedure as part of a PDCCH ordered RACH. The base station 105-d may be capable of downlink transmission according to multiple downlink transmit beams 505, as part of a beam sweeping procedure. Each of the downlink transmit beams 505 may be associated with a SSB, for transmitting one or more SSBs in distinct directions according to the beam sweep. Each SSB associated with the transmit beams 505 may be mapped to a RACH occasion 515 within the time domain on resources of the RACH. Additionally, each RACH occasion 515 may contain one or more relative RACH occasions 520 in frequency, meaning each SSB may be mapped to one or more consecutive relative RACH occasions 520.

The UE 115-d may be capable of transmitting uplink signaling on one or more uplink transmit beams 510, as part of an uplink transmit beam sweep for PDCCH ordered multiple Msg1 transmissions. The UE 115-d may perform uplink beam sweep over the one or more uplink transmit beams 510 to enhance multi-beam diversity during the RAR window, for the UEs with supported beam correspondence. Accordingly, each of the base station 105-d and the UE 115-d may support associated receive beams for beamformed communication in relation to the transmit beams 505 and 510.

The signal exchange 500 may include a plurality of transmission opportunities containing multiple RACH occasions mapped according to SSBs of the base station 105-d. During each of the transmission opportunities the UE 115-d may receive signaling indication from the base station 105-d and perform uplink transmission according to a configured RACH occasion using a single uplink transmit beam 510. In some cases, the UE 115-*d* may use a different uplink transmit beam 510 in consecutive transmission opportunities. In other cases, the UE 115-*d* may use the same uplink transmit beam 510 in consecutive transmission opportunities. The base station 105-*d* may cycle through each of the supported downlink transmit beams 505 during a transmission opportunity. Alternatively, the base station 105-*d* may be capable of receiving on a single reception beam and may use a single transmission beam 505 during each transmission opportunity. The one or more transmission opportunities may span at least a portion of the configured RAR window.

As described, the UE 115-*d* may support beam correspondence and may obtain multi-beam diversity during RACH transmission and performing multiple Msg1 transmissions on RACH occasions corresponding to different SSB or CSI-RS index values. As part of the supported beam correspondence, the UE 115-*d* may be capable of detecting signaling of the base station 105-*d* associated with one or more SSBs and transmit beam directions (e.g., multiple downlink transmit beams 505) at a single receive beam. UE 115-*d* may transmit multiple Msg1 transmissions corresponding to different SSBs with a single uplink transmit beam 510. That is, the UE 115-*d* may support a transmission scheme where the UE 115-*d* may transmit multiple Msg1 transmissions corresponding to the set of SSBs the UE 115-*d* is capable of detecting simultaneously on the RACH using a single receive beam.

For example, the UE 115-*d* may transmit a first Msg1 via transmit beam 510-*b* on a RACH occasion corresponding to time resources of a SSB index value associated with a first SSB. The first SSB may correspond to a downlink transmit beam 505-*a* of base station 105-*d*. Based on the supported capability for beam correspondence, the UE 115-*d* may listen for Msg2 transmissions on a receive beam capable of detecting downlink signaling of the first SSB, as configured at the base station 105-*d*. The UE 115-*d* may transmit a second Msg1 via transmit beam 510-*b* on a consecutive RACH occasion of the following transmit opportunity, the RACH occasion corresponding to time resources associated with a second SSB corresponding to downlink transmit beam 505-*b*. The UE 115-*d* may then listen for Msg2 responses associated with the first SSB and the second SSB at the configured receive beam of the UE 115-*d*. The UE 115-*d* may then transmit a third Msg1 via transmit beam 510-*c* on a RACH occasion of the following transmit opportunity, the RACH occasion corresponding to time resources associated with a third SSB corresponding to downlink transmit beam 505-*c*. The UE 115-*d* may listen for Msg2 responses associated with the first SSB, second SSB, and third SSB at the configured receive beam following the third Msg1 transmission. The UE 115-*d* may continue the multiple Msg1 transmissions corresponding to the set of SSBs the UE 115-*d* is capable of detecting simultaneously (e.g., at a single receive beam) based on the number of Msg1 transmissions configured within the RAR window.

Figure 6:
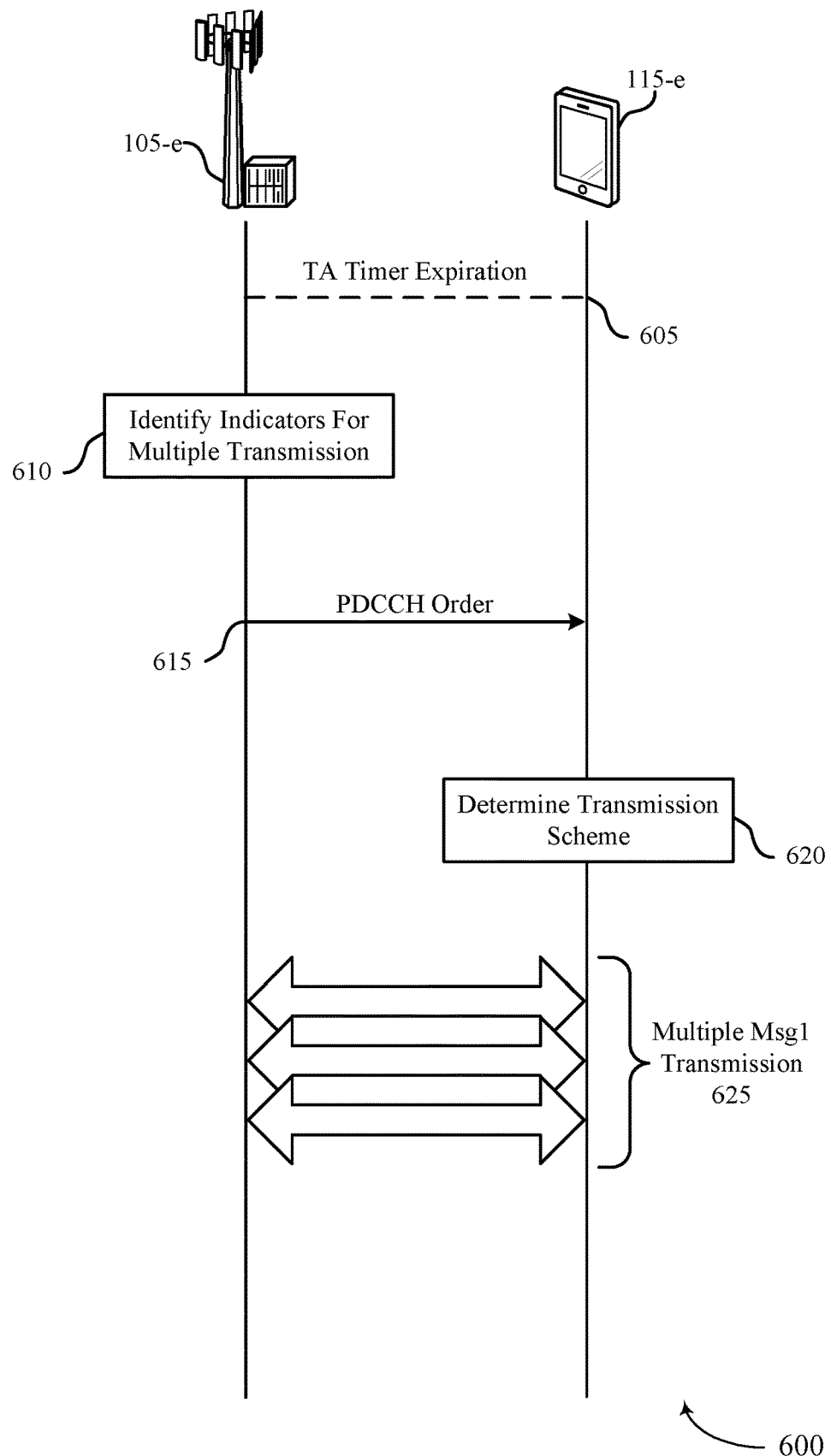
FIG. 6 illustrates an example of a process flow that supports multiple msg1 for PDCCH ordered RACH in accordance with aspects of the present disclosure.

FIG. 6 illustrates an example of a process flow 600 that supports multiple Msg1 for PDCCH ordered RACH in accordance with aspects of the present disclosure. Process flow 600 may include multiple Msg1 transmissions and may be associated with a CFRA procedure as part of a PDCCH ordered RACH, as described with reference to FIGS. 2 through 5. The described features of process flow 600 may be performed by a base station 105-*e* and a UE 115-*e*, which may be examples of one or more base stations 105 and STAs 115, described with reference to FIGS. 1 through 5.

At 605, each of the UE 115-*e* and the base station 105-*e* may determine a time alignment timer at the UE 115-*e* has expired. Based on the time alignment timer expiration, UE 115-*e* may be considered out of synchronization with the network.

At 610, the base station 105-*e* may identify one or more indicators associated with a control information configuration of a PDCCH order, for initiating CFRA on the RACH. As part of the identifying, base station 105-*e* may configure time and frequency location information or procedure information for performing connectivity request on the RACH.

In some cases, the base station 105-*e* may configure one or more bit indications within control information (e.g., DCI) of a PDCCH order as part of identifying indicators of the configuration. The base station 105-*e* may format the PDDCH order according to a DCI format (e.g., DCI 1A format) that includes a preamble index for performing CFRA procedure. The base station 105-*e* may configure the PDCCH order to include one or more bit indications of an SSB index and relative RACH occasion indices for indicating RACH occasions for multiple Msg1 transmissions. Additionally, the base station 105-*e* may configure bit contents of the PDCCH order to enable multiple Msg1 transmissions and indicate the number of consecutive Msg1 transmissions the UE 115-*e* may transmit based on the PDCCH order, to improve the link budget through non-coherent combining.

In some cases, the base station 105-*e* may indicate the time and frequency location parameters using the same preamble index and relative RACH occasions corresponding to a single SSB and relative RACH index, for the UE 115-*e* to perform the multiple Msg1 transmissions in a cyclic consecutive manner during the RACH occasions. In other cases, the base station 105-*e* may determine explicit time and frequency location parameters for each Msg1 transmission opportunity. The explicit time and frequency location parameters may correspond to one or more relative RACH occasion index values for an SSB index associated with the RACH occasions of the transmit opportunities. Additionally or alternatively, UE 115-*e* may support beam correspondence for performing CFRA. As part of the PDDCH controlled RACH, the base station 105-*e* may configure the PDCCH order to include indication for performing Msg1 transmissions at the UE 115-*e* for each of the supported control beams. The configuration may include indication of RACH preambles and time and frequency scheduling indications for performing multiple Msg1 transmissions within the available RACH occasions in accordance with the multiple configured CORESETs.

At 615, the base station 105-*e* may then perform directional transmission of the PDDCH order to the UE 115-*e*, as part of the CFRA procedure. The PDCCH order may include one or more indicators within the formatted DCI for the UE 115-*e* to perform the multiple Msg1 transmissions during the configured RAR window of the RACH. Additionally, the base station 105-*e* may indicate to the UE 115-*e*, either via the DCI of the PDDCH order or independently through MAC-CE or RRC signaling, to use different uplink transmit beams as part of a beam sweep for performing the multiple Msg1 transmissions.

At 620, the UE 115-*e* may receive the PDCCH order and process the included control information for performing communication exchange with the base station 105-*e* as part of the CFRA procedure, including multiple Msg1 transmissions and listening for Msg2 responses over the RACH. Based on the processing, UE 115-*e* may determine a transmission scheme for performing multiple Msg1 transmissions over the RAR window. In some cases, the transmission scheme may be associated with a cyclic consecutive multiple Msg1 transmission, as indicated in the received PDCCH order. In other cases, the transmission scheme may correspond to explicit time and frequency location indications provided by the PDCCH order. The UE 115-e may be configured to follow a mapping rule for processing the bit indications associated with an SSB index and relative RACH occasion indices for determining specific RACH locations for multiple Msg1 transmissions via one or more uplink transmit beams.

At 625, the UE 115-e may perform multiple Msg1 transmissions and listen for Msg2 response from the base station 105-e. The UE 115-e may then perform multiple Msg1 transmissions during the RACH occasions corresponding to an SSB index and a relative RACH occasion index provided as part of the control information of the received PDCCH control. Additionally, UE 115-e may perform the multiple Msg1 transmissions based on the number of configured consecutive PDCCH ordered Msg1 transmissions.

Figure 7:
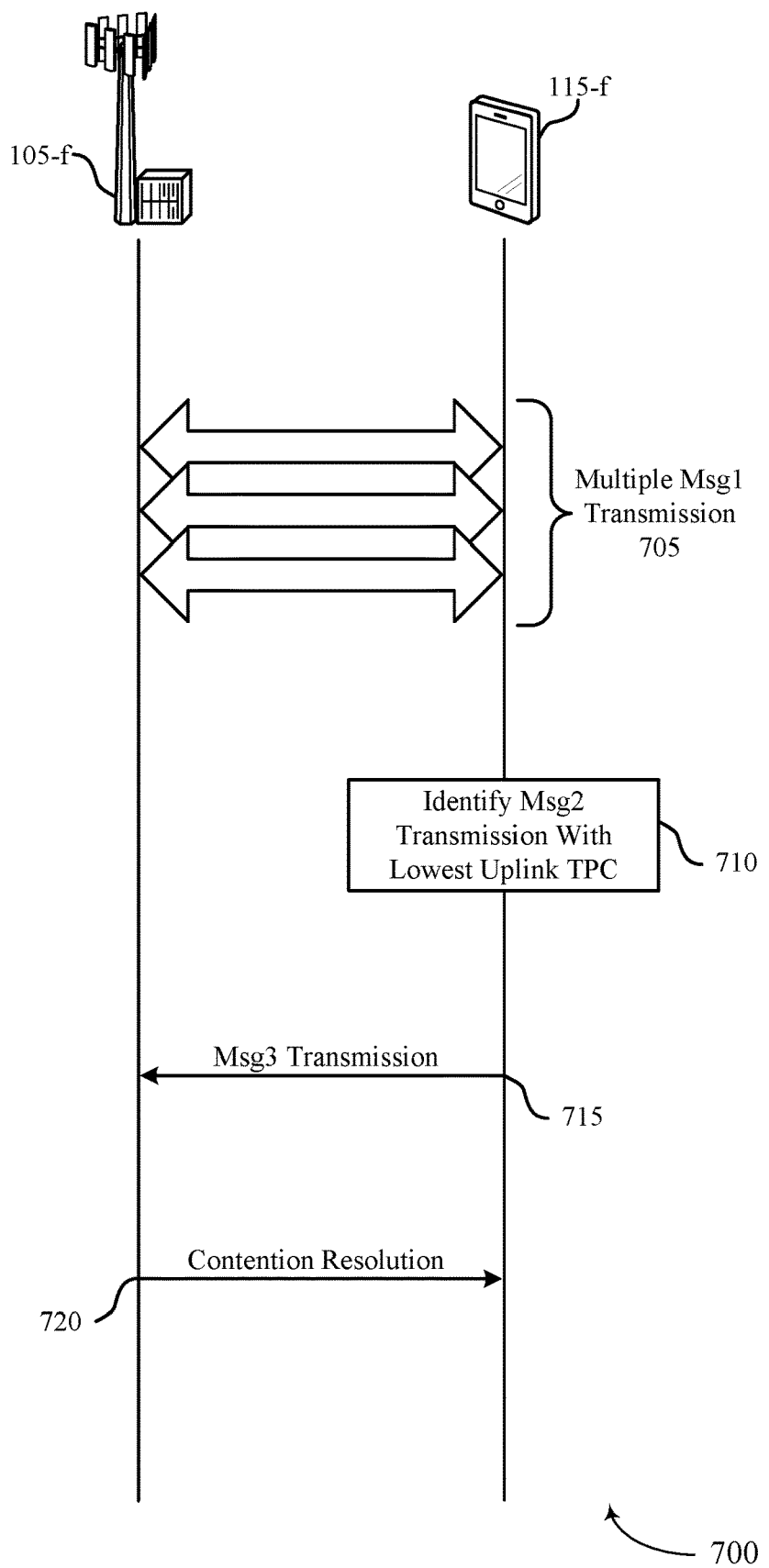
FIG. 7 illustrates an example of a process flow that supports multiple msg1 for PDCCH ordered RACH in accordance with aspects of the present disclosure.

FIG. 7 illustrates an example of a process flow 700 that supports multiple Msg1 for PDCCH ordered RACH in accordance with aspects of the present disclosure. Process flow 700 may include multiple Msg1 transmissions and may be associated with a CBRA procedure as part of an initial access or connection reestablishment, as described with reference to FIG. 2. The described features of process flow 700 may be performed by a base station 105-f and a UE 115-f, which may be examples of one or more base stations 105 and STAs 115, described with reference to FIGS. 1 through 6.

At 705, the UE 115-f may transmit multiple Msg1 transmissions on RACH occasions of the channel and listen for Msg2 responses from the base station 105-b. The UE 115-f may transmit the multiple Msg1 transmissions via different uplink transmit beams to increase transmit diversity and improve message throughput on the channel. As detailed, in some cases the UE 115-a may transmit the multiple Msg1 transmissions in a cyclic consecutive manner according to the same relative RACH index for each RACH occasion. In other cases, the UE 115-a may transmit the multiple Msg1 transmissions on variant resources within the RACH occasions based on pre-specified rules for transmission. The multiple Msg1 transmissions may support the same uplink transmit power for each of the different uplink transmit beams.

The base station 105-f may receive the multiple Msg1 transmissions for performing CBRA and measure the RACH receive power associated with the Msg1 transmissions from the different uplink receive beams of the UE 115-f. The base station 105-f may then configure Msg2 responses for each of the received Msg1 transmissions of the RACH occasions based on the reception. The Msg2 responses may include uplink transmit power commands for subsequent RACH signaling on the corresponding uplink transmit beams. The uplink transmit power commands may be based on the measured RACH receive power of the multiple Msg1 transmissions. For example, the base station 105-f may identify the uplink transmit beam associated with the Msg1 transmissions having the highest PRACH receive power. The base station 105-a may then configure a lowest uplink transmit power command for the respective uplink transmit beam. Following the configuration, the base station 105-f may transmit the Msg2 responses for the multiple Msg1 transmissions to the UE 115-f for subsequent signaling procedure associated with performing the CBRA.

At 710, the UE 115-f may receive the multiple Msg2 responses and process the contained uplink transmit power commands for performing subsequent message (e.g., L2/L3 Msg 3) transmission at the UE. For example, the UE 115-f may evaluate the received Msg2 responses and determine the Msg2 response containing the lowest uplink transmit power command (i.e., the Msg2 response to the Msg1 transmission with the highest PRACH receive power). Based on the determination, the UE 115-a may then select the Msg2 response containing the lowest uplink transmit power command.

At 715, the UE 115-f may perform a single Msg3 transmission on the associated uplink transmit beam in accordance with the contained transmit power command. By performing a single Msg3 transmission, the UE 115-f may reduce signaling overhead associated with performing CBRA procedure while enhancing signaling diversity to determine the best uplink transmit beam for completing CBRA. The AP 105-f may receive the Msg3 transmission from the UE 115-f and, at 720, transmit a contention resolution message in response to the Msg3 transmission.

Figure 8:
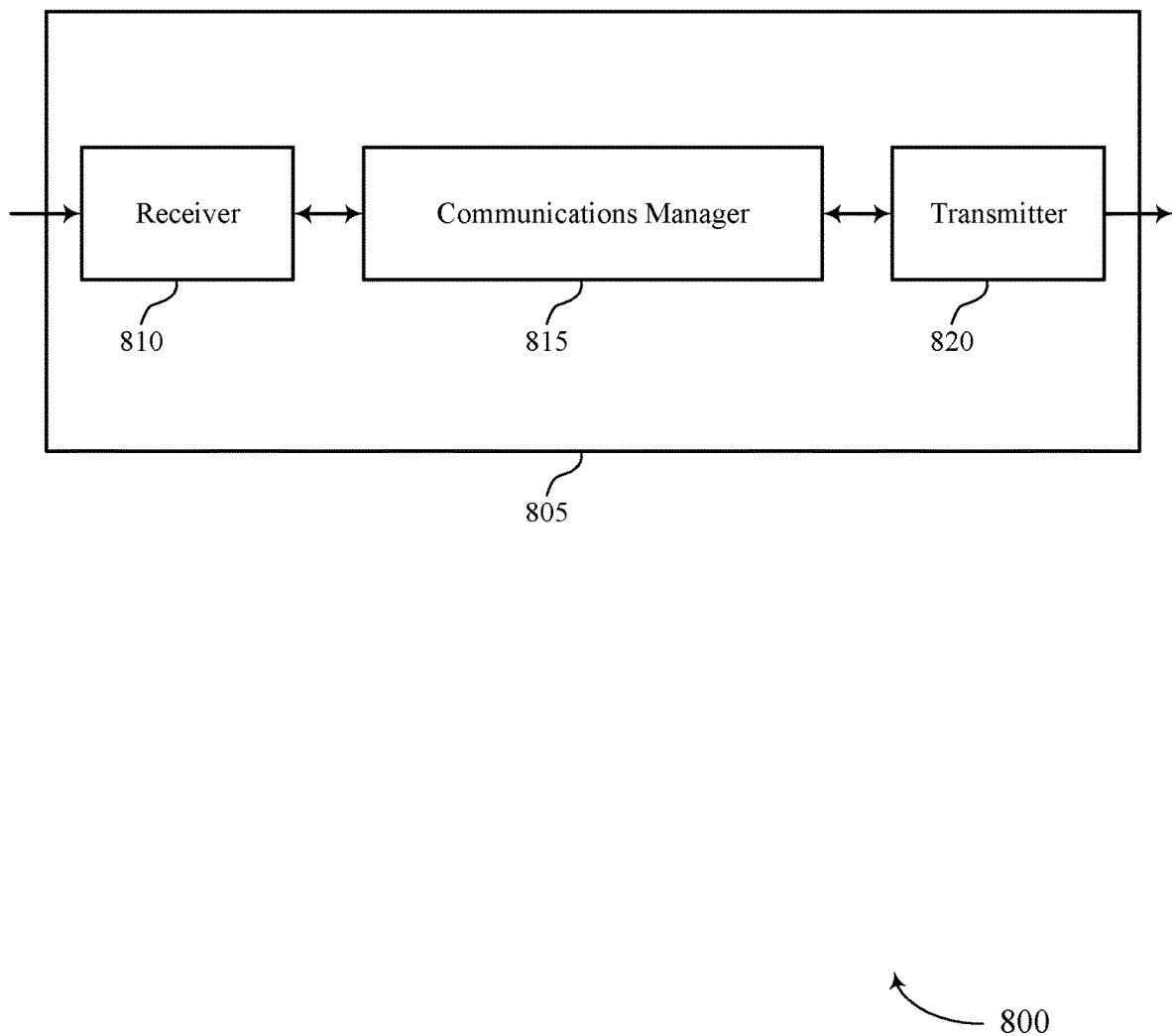
FIGS. 8 and 9 show block diagrams of devices that support multiple msg1 for PDCCH ordered RACH in accordance with aspects of the present disclosure.

FIG. 8 shows a block diagram 800 of a device 805 that supports multiple Msg1 for PDCCH ordered RACH in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to multiple Msg1 for PDCCH ordered RACH, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine to perform random access channel procedure with a base station, receive control information from the base station as part of a physical downlink control channel order random access channel procedure, the control information including one or more indicators for multiple transmissions of a first type of random access channel message, the one or more indicators including time and frequency location information, procedure information, or a combination thereof for the multiple transmissions, and determine a transmission scheme for the multiple transmissions based on the control information, the multiple transmissions performed by the UE during a random access response window.

The communications manager 815 may also transmit a first type of message for random access channel procedure from one or more UL transmit beams as part of multiple transmissions to a base station during a random access response window, transmit the message based on the selecting, receive, from the base station, one or more random access channel responses based on the multiple transmissions, the one or more random access channel responses including an UL transmit power command for subsequent transmissions of a second type of message at the UE, and select a message of the second type of message based on the one or more responses, the message associated with a lowest UL transmit power command included in the one or more responses. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
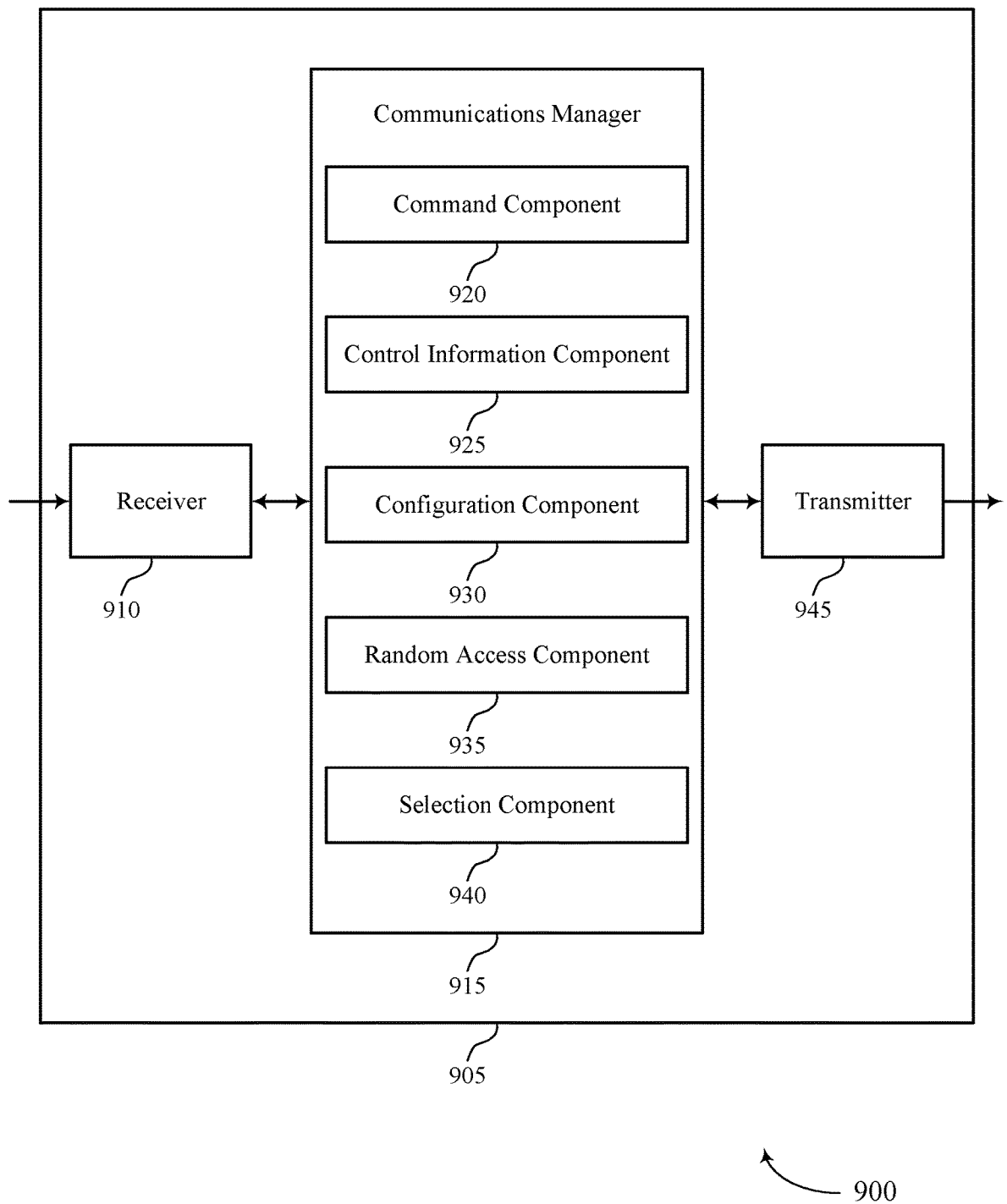

FIG. 9 shows a block diagram 900 of a device 905 that supports multiple Msg1 for PDCCH ordered RACH in accordance with aspects of the present disclosure. The device 905 may be an example of aspects of a device 805, or a UE 115 as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to multiple Msg1 for PDCCH ordered RACH, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a command component 920, a control information component 925, a configuration component 930, a random access component 935, and a selection component 940. The communications manager 915 may be an example of aspects of the communications manager 1110 described herein.

The command component 920 may determine to perform random access channel procedure with a base station.

The control information component 925 may receive control information from the base station as part of a physical downlink control channel order random access channel procedure, the control information including one or more indicators for multiple transmissions of a first type of random access channel message, the one or more indicators including time and frequency location information, procedure information, or a combination thereof for the multiple transmissions.

The control information component 925 may also receive, from the base station, one or more random access channel responses based on the multiple transmissions, the one or more random access channel responses including an UL transmit power command for subsequent transmissions of a second type of message at the UE.

The configuration component 930 may determine a transmission scheme for the multiple transmissions based on the control information, the multiple transmissions performed by the UE during a random access response window.

The random access component 935 may transmit a first type of message for random access channel procedure from one or more UL transmit beams as part of multiple transmissions to a base station during a random access response window and transmit the message based on the selecting.

The selection component 940 may select a message of the second type of message based on the one or more responses, the message associated with a lowest UL transmit power command included in the one or more responses.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
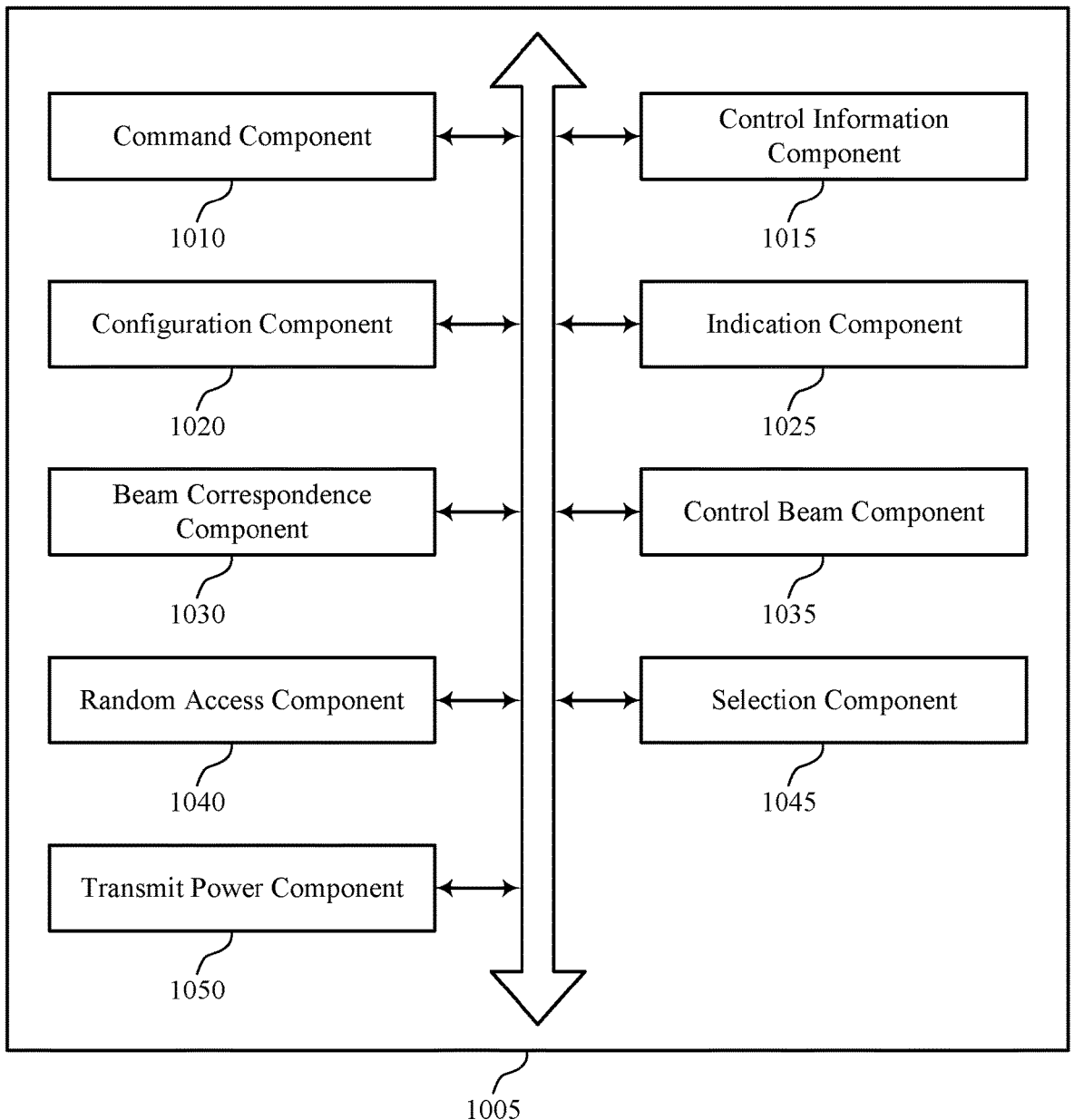
FIG. 10 shows a block diagram of a communications manager that supports multiple msg1 for PDCCH ordered RACH in accordance with aspects of the present disclosure.

FIG. 10 shows a block diagram 1000 of a communications manager 1005 that supports multiple Msg1 for PDCCH ordered RACH in accordance with aspects of the present disclosure. The communications manager 1005 may be an example of aspects of a communications manager 815, a communications manager 915, or a communications manager 1110 described herein. The communications manager 1005 may include a command component 1010, a control information component 1015, a configuration component 1020, an indication component 1025, a beam correspondence component 1030, a control beam component 1035, a random access component 1040, a selection component 1045, and a transmit power component 1050. Each of these modules may communicate, directly or indirectly, with one another (e.g., via one or more buses).

The command component 1010 may determine to perform random access channel procedure with a base station.

The control information component 1015 may receive control information from the base station as part of a physical downlink control channel order random access channel procedure, the control information including one or more indicators for multiple transmissions of a first type of random access channel message, the one or more indicators including time and frequency location information, procedure information, or a combination thereof for the multiple transmissions.

In some examples, the control information component 1015 may receive, from the base station, one or more random access channel responses based on the multiple transmissions, the one or more random access channel responses including an UL transmit power command for subsequent transmissions of a second type of message at the UE.

In some examples, receiving the one or more responses from the base station includes receiving one or more Msg2 responses for the random access channel procedure. In some cases, the control information is received as part of downlink control information contents of the physical downlink control channel order, control information included in a medium access control-control element, data included in radio resource control messaging, or a combination thereof.

The configuration component 1020 may determine a transmission scheme for the multiple transmissions based on the control information, the multiple transmissions performed by the UE during a random access response window.

In some examples, the configuration component 1020 may determine a transmission scheme for a number of transmissions of the first type of random access channel message for performing the multiple transmissions. In some examples, the configuration component 1020 may determine explicit locations for each transmission of the first type of random access channel message for performing the multiple transmissions during random access channel occasions of the random access response window.

The indication component 1025 may identify a synchronization signal block index for performing the multiple transmissions based on processing the control information.

In some examples, the indication component 1025 may determine a preamble index and a relative random access channel occasion index within the random access channel occasions corresponding to the synchronization signal block index based on processing the control information.

The beam correspondence component 1030 may receive an indication for implementing one or more UL transmit beams as part of an UL transmit beam sweep for the multiple transmissions.

In some examples, the beam correspondence component 1030 may determine the one or more UL transmit beams based on the indication. In some examples, the beam correspondence component 1030 may determine one or more synchronization signal blocks that the UE can detect simultaneously on a DL receive beam at the UE. In some examples, the beam correspondence component 1030 may transmit, based on the determining, the multiple transmissions during random access channel occasions of the random access response window, the random access channel occasions corresponding to indices of the one or more synchronization signal blocks.

In some examples, the beam correspondence component 1030 may receive, from the base station, an interleaving pattern within the random access response window for random access channel occasions corresponding to one or more synchronization signal block indices. In some examples, the beam correspondence component 1030 may transmit, based on the interleaving pattern, the multiple transmissions during the random access channel occasions, the multiple transmissions corresponding to one or more synchronization signal blocks or channel state information reference signals.

The control beam component 1035 may receive an indication via the physical downlink control channel order for performing the multiple transmissions in association with one or more control beams supported by the base station, the one or more control beams associated with different control resource sets and having different timing advance groups.

In some cases, the multiple transmissions of the first type of random access channel message include Msg1 transmissions to the base station for the physical downlink control channel order random access channel procedure. In some cases, the multiple transmissions occur in a cyclic consecutive manner during random access channel occasions of the random access response window.

In some cases, the cyclic consecutive manner includes Msg1 transmissions from the UE in the same random access channel index during random access channel occasions of the random access response window, where the random access channel occasions correspond to consecutive random access channel occasions associated with the same synchronization signal block index or channel state information reference signal index.

The random access component 1040 may transmit a first type of message for random access channel procedure from one or more UL transmit beams as part of multiple transmissions to a base station during a random access response window.

In some examples, the random access component 1040 may transmit the message based on the selecting. In some examples, the random access component 1040 may transmit, to the base station, one or more transmissions of the multiple transmissions during the random access response window using one or more UL transmit beams at the UE. In some examples, the random access component 1040 may receive, based on the transmitting, one or more responses from the base station.

In some cases, the one or more responses from the base station include random access channel responses for the physical downlink control channel order random access channel procedure. In some cases, the one or more responses each include an UL transmit power command for subsequent transmission of a second type of message at the UE. In some cases, the transmission of the second type of message includes a schedule for a Msg3 transmission to the base station for the physical downlink control channel order random access channel procedure.

In some cases, the first type of message includes a Msg1 for the random access channel procedure. In some cases, the second type of message includes a Msg3 for the random access channel procedure. In some cases, the random access channel procedure is a contention-based random access channel procedure.

The selection component 1045 may select a message of the second type of message based on the one or more responses, the message associated with a lowest UL transmit power command included in the one or more responses.

The transmit power component 1050 may determine an UL transmit power. In some cases, the multiple transmissions have the same UL transmit power for each of the one or more UL transmit beams.

Figure 11:
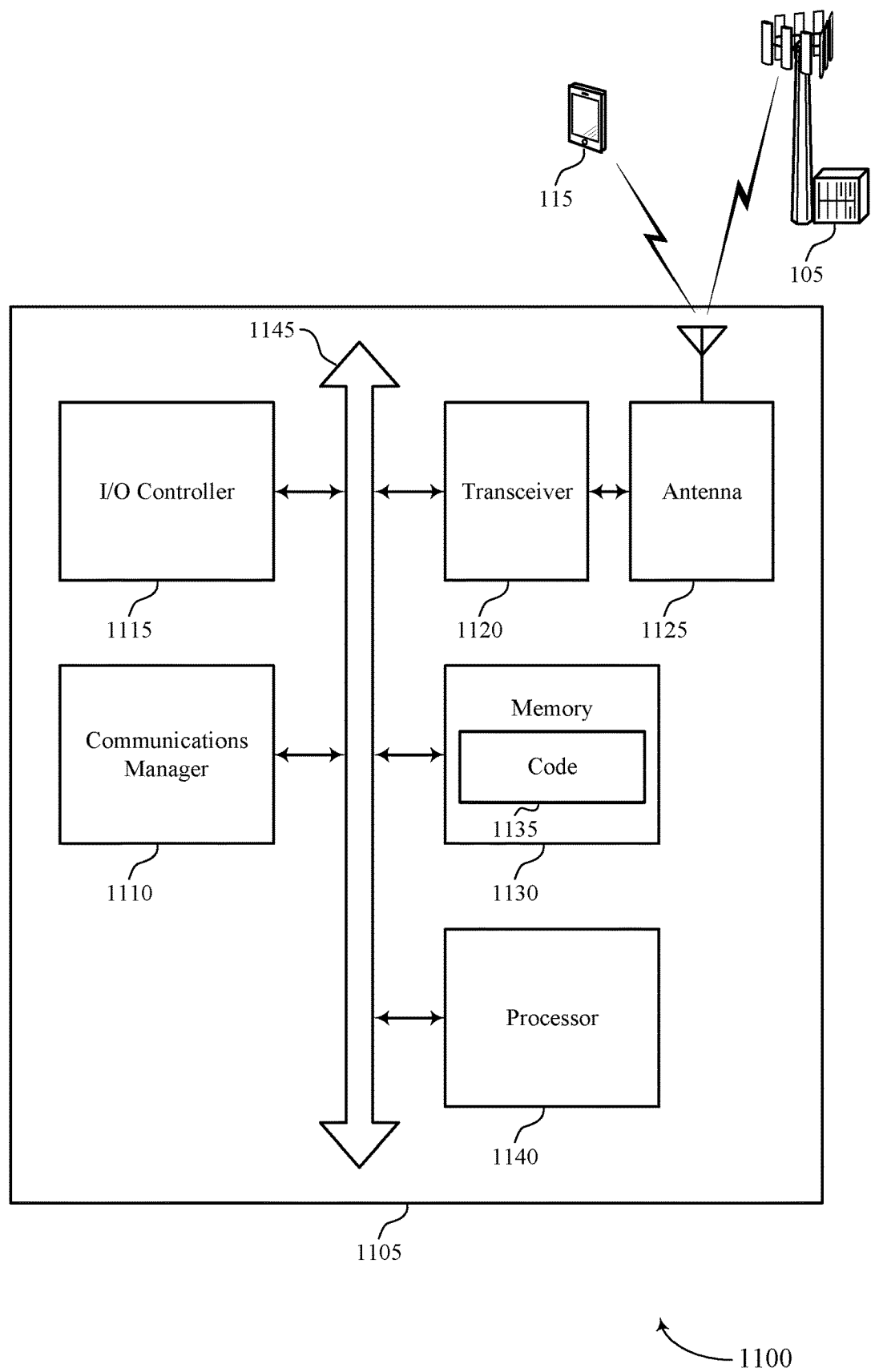
FIG. 11 shows a diagram of a system including a device that supports multiple msg1 for PDCCH ordered RACH in accordance with aspects of the present disclosure.

FIG. 11 shows a diagram of a system 1100 including a device 1105 that supports multiple Msg1 for PDCCH ordered RACH in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may determine to perform random access channel procedure with a base station, receive control information from the base station as part of a physical downlink control channel order random access channel procedure, the control information including one or more indicators for multiple transmissions of a first type of random access channel message, the one or more indicators including time and frequency location information, procedure information, or a combination thereof for the multiple transmissions, and determine a transmission scheme for the multiple transmissions based on the control information, the multiple transmissions performed by the UE during a random access response window.

The communications manager 1110 may also transmit a first type of message for random access channel procedure from one or more UL transmit beams as part of multiple transmissions to a base station during a random access response window, transmit the message based on the selecting, receive, from the base station, one or more random access channel responses based on the multiple transmissions, the one or more random access channel responses including an UL transmit power command for subsequent transmissions of a second type of message at the UE, and select a message of the second type of message based on the one or more responses, the message associated with a lowest UL transmit power command included in the one or more responses.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multiple Msg1 for PDCCH ordered RACH).

Figure 12:
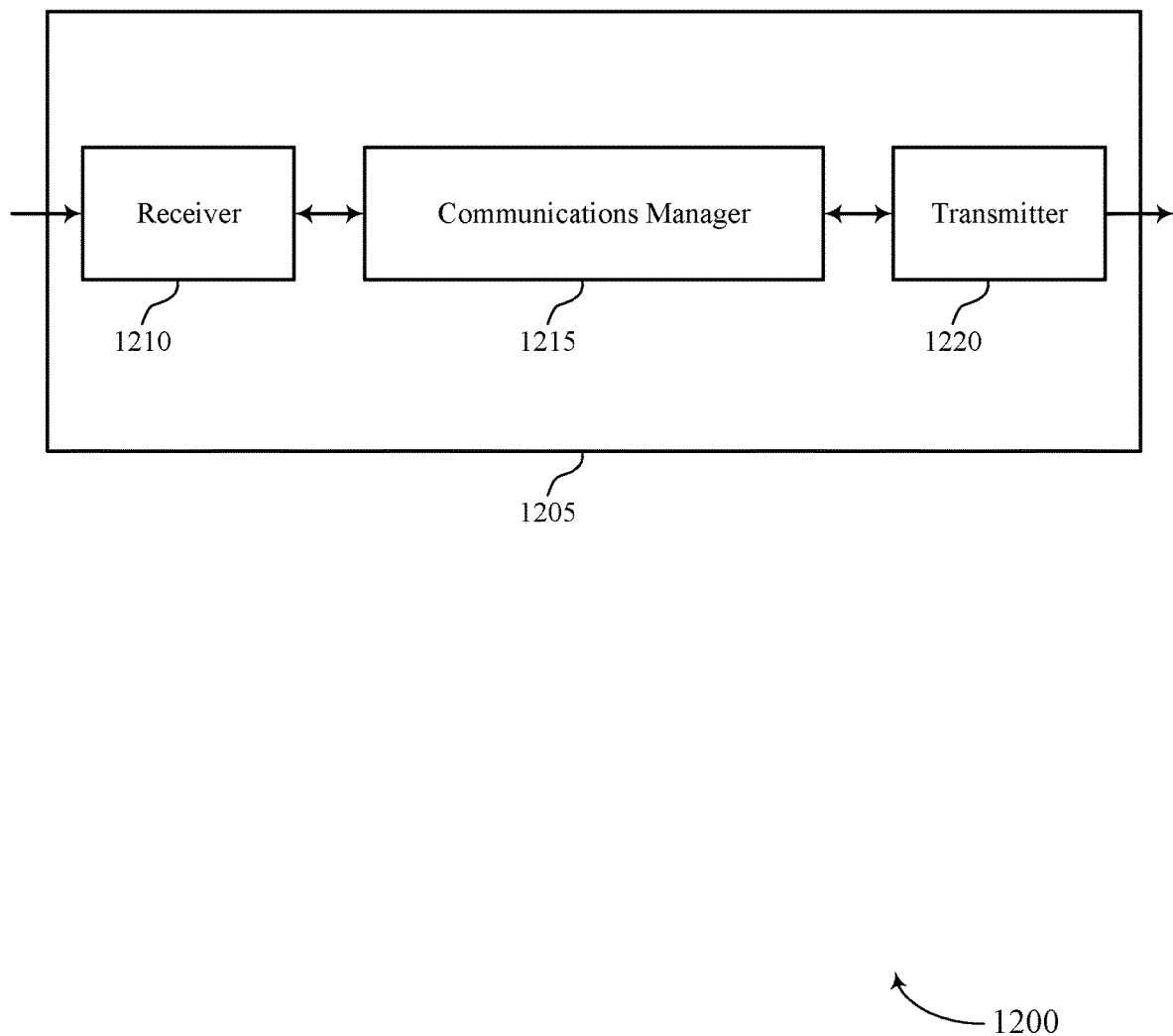
FIGS. 12 and 13 show block diagrams of devices that support multiple msg1 for PDCCH ordered RACH in accordance with aspects of the present disclosure.

FIG. 12 shows a block diagram 1200 of a device 1205 that supports multiple msg1 for PDCCH ordered RACH in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to multiple Msg1 for PDCCH ordered RACH, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may determine a command for a UE to perform random access channel procedure, identify indicators of a configuration for multiple transmissions of a first type of random access channel message based on the determining, the indicators included in a physical downlink control channel order random access channel procedure, the indicators including time and frequency location information, procedure information, or a combination thereof for the multiple transmissions, and transmit the indicators to establish the configuration.

The communications manager 1215 may also receive a first type of message for a random access channel procedure from one or more UL transmit beams of a UE as part of multiple transmissions during a random access response window, receive a transmission of the second type of message from the UE based on the transmitting, the second type of message associated with a lowest UL transmit power command included in the one or more responses, and transmit, to the UE, one or more random access channel responses based on the receiving, the one or more responses including an UL transmit power command for subsequent transmissions of a second type of message at the UE. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
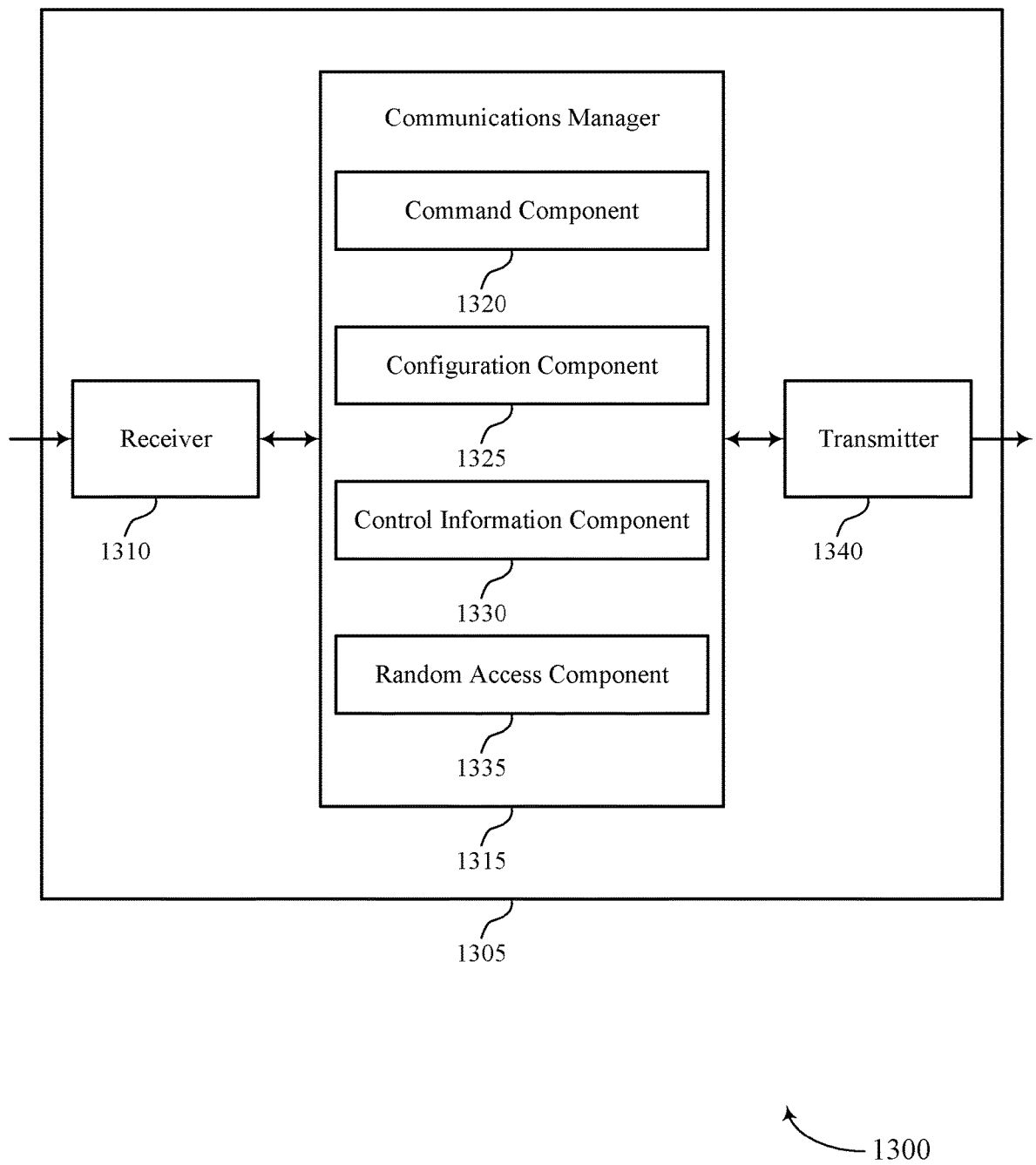

FIG. 13 shows a block diagram 1300 of a device 1305 that supports multiple msg1 for PDCCH ordered RACH in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to multiple msg1 for PDCCH ordered RACH, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a command component 1320, a configuration component 1325, a control information component 1330, and a random access component 1335. The communications manager 1315 may be an example of aspects of the communications manager 1510 described herein.

The command component 1320 may determine a command for a UE to perform random access channel procedure.

The configuration component 1325 may identify indicators of a configuration for multiple transmissions of a first type of random access channel message based on the determining, the indicators included in a physical downlink control channel order random access channel procedure, the indicators including time and frequency location information, procedure information, or a combination thereof for the multiple transmissions.

The control information component 1330 may transmit the indicators to establish the configuration.

The control information component 1330 may also transmit, to the UE, one or more random access channel responses based on the receiving, the one or more responses including an UL transmit power command for subsequent transmissions of a second type of message at the UE.

The random access component 1335 may receive a first type of message for a random access channel procedure from one or more UL transmit beams of a UE as part of multiple transmissions during a random access response window and receive a transmission of the second type of message from the UE based on the transmitting, the second type of message associated with a lowest UL transmit power command included in the one or more responses.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
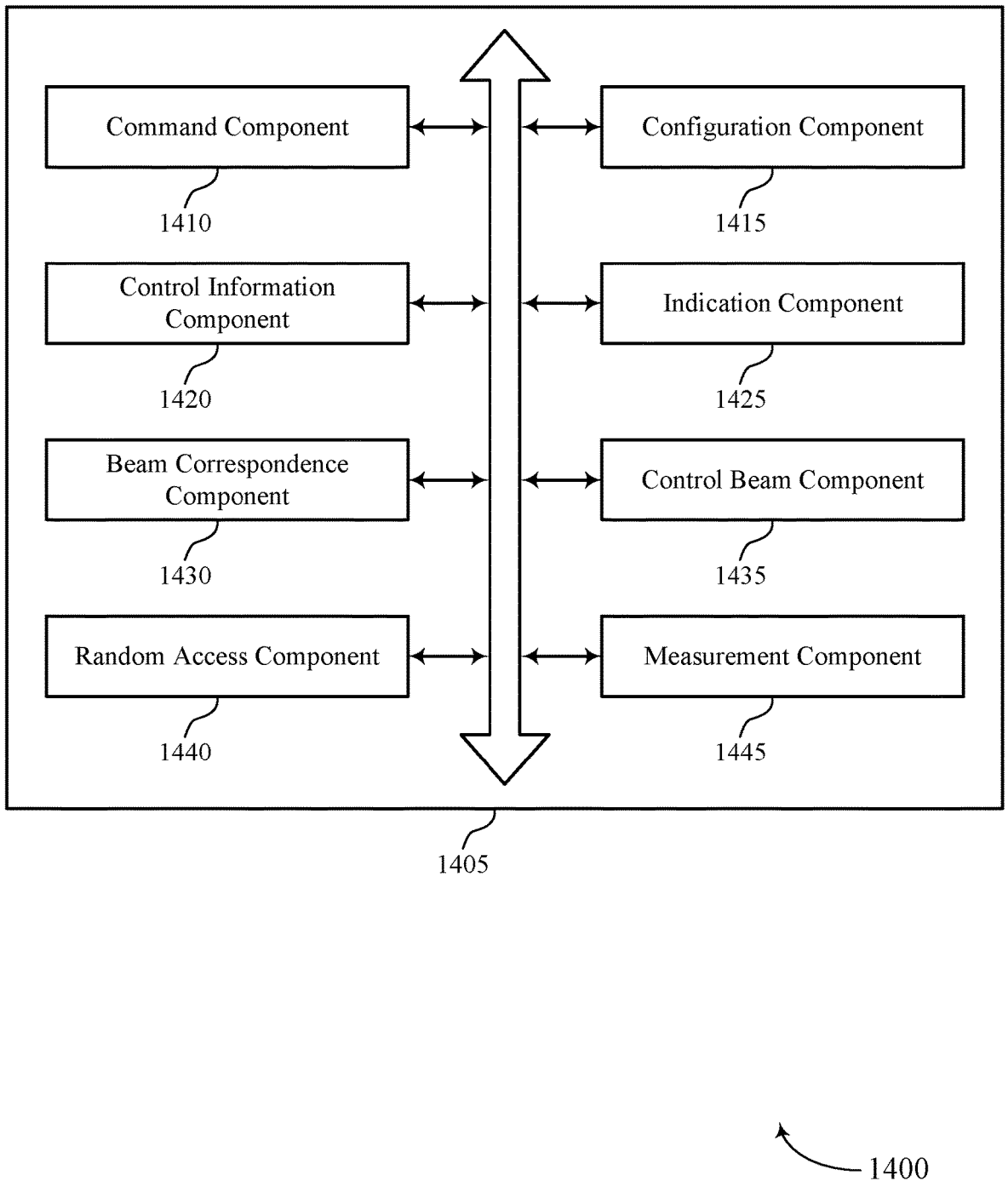
FIG. 14 shows a block diagram of a communications manager that supports multiple msg1 for PDCCH ordered RACH in accordance with aspects of the present disclosure.

FIG. 14 shows a block diagram 1400 of a communications manager 1405 that supports multiple Msg1 for PDCCH ordered RACH in accordance with aspects of the present disclosure. The communications manager 1405 may be an example of aspects of a communications manager 1215, a communications manager 1315, or a communications manager 1510 described herein. The communications manager 1405 may include a command component 1410, a configuration component 1415, a control information component 1420, an indication component 1425, a beam correspondence component 1430, a control beam component 1435, a random access component 1440, and a measurement component 1445. Each of these modules may communicate, directly or indirectly, with one another (e.g., via one or more buses).

The command component 1410 may determine a command for a UE to perform random access channel procedure.

The configuration component 1415 may identify indicators of a configuration for multiple transmissions of a first type of random access channel message based on the determining, the indicators included in a physical downlink control channel order random access channel procedure, the indicators including time and frequency location information, procedure information, or a combination thereof for the multiple transmissions.

In some examples, the configuration component 1415 may determine explicit locations for each transmission of the first type of random access channel message for performing the multiple transmissions during random access channel occasions of the random access response window. In some examples, the configuration component 1415 may identify indicators of the configuration for multiple transmissions based on the determining.

In some cases, the multiple transmissions of the first type of random access channel message include Msg1 transmissions from the UE for the physical downlink control channel order random access channel procedure. In some cases, the multiple transmissions occur in a cyclic consecutive manner during random access channel occasions of the random access response window. In some cases, the cyclic consecutive manner includes Msg1 transmissions from the UE in the same random access channel index during random access channel occasions of the random access response window, where the random access channel occasions correspond to consecutive random access channel occasions associated with the same synchronization signal block index or channel state information reference signal index.

The control information component 1420 may transmit the indicators to establish the configuration.

In some examples, the control information component 1420 may transmit, to the UE, one or more random access channel responses based on the receiving, the one or more responses including an UL transmit power command for subsequent transmissions of a second type of message at the UE.

In some cases, the control information is included as part of downlink control information contents of the physical downlink control channel order, control information included in a medium access control-control element, data included in radio resource control messaging, or a combination thereof. In some cases, the one or more responses from the base station include one or more Msg2 responses for the random access channel procedure.

The indication component 1425 may identify indicators of the configuration for a number of transmissions of the first type of random access channel message for performing the multiple transmissions.

In some examples, the indication component 1425 may identify indicators of the configuration for a set of bits to indicate random access channel occasion indices for the multiple transmissions during the random access response window. In some examples, the indication component 1425 may identify indicators of the configuration for a first set of the set of bits to indicate a synchronization signal block index, the synchronization signal block index corresponding to random access channel occasions in time during the random access response window.

In some examples, the indication component 1425 may identify indicators of the configuration for a second set of the set of bits to indicate a relative random access channel occasion index, the relative random access channel occasion index corresponding to random access channel occasions among a group of random access channel occasions corresponding to a synchronization signal block index. In some examples, the indication component 1425 may indicate the time and frequency location information within the preamble framework of the physical downlink control channel order random access channel procedure. In some examples, the indication component 1425 may identify indicators of the configuration for an interleaving pattern within the random access response window for random access channel occasions corresponding to one or more synchronization signal block indices and corresponding DL receive beams at the UE.

The beam correspondence component 1430 may transmit an indication for implementing one or more one or more uplink (UL) transmit beams at the UE as part of an UL transmit beam sweep for the multiple transmissions.

In some examples, the beam correspondence component 1430 may determine an UL transmit beam at the UE associated with a lowest UL transmit power for the multiple transmissions, the UL transmit beam included as part of an UL transmit beam sweep by the UE. In some examples, the beam correspondence component 1430 may transmit an indication to the UE based on the determining, the indication including a notification of the UL transmit beam. In some cases, the UE supports beam correspondence.

The control beam component 1435 may transmit an indication via the physical downlink control channel order for performing the multiple transmissions in association with one or more control beams supported by the base station, the one or more control beams associated with different control resource sets and having different timing advance groups.

In some examples, the control beam component 1435 may identify indicators of the configuration for at least one of a random access channel preamble or random access channel occasion for the multiple transmissions in association with the one or more control beams. In some examples, the control beam component 1435 may transmit an indication via the physical downlink control channel order based on the configuring.

The random access component 1440 may receive a first type of message for a random access channel procedure from one or more UL transmit beams of a UE as part of multiple transmissions during a random access response window.

In some examples, the random access component 1440 may receive a transmission of the second type of message from the UE based on the transmitting, the second type of message associated with a lowest UL transmit power command included in the one or more responses. In some examples, the random access component 1440 may receive, from the UE, one or more transmissions of the multiple transmissions during the random access response window, the one or more transmissions received on one or more UL receive beams at the base station, the one or more UL receive beams associated with synchronization signal blocks. In some examples, the random access component 1440 may transmit, based on the receiving, one or more responses to the UE.

In some examples, receiving the first type of message includes receiving a Msg1 transmission from the UE for the random access channel procedure. In some examples, receiving the transmission of the second type of message includes receiving a Msg3 transmission from the UE for the random access channel procedure. In some cases, the one or more responses to the UE include random access channel responses for the physical downlink control channel order random access channel procedure.

In some cases, the one or more responses each include an UL transmit power command for subsequent transmission of a second type of message from the UE. In some cases, the transmission of the second type of message includes a schedule for a Msg3 transmission from the UE for the physical downlink control channel order random access channel procedure. In some cases, the random access channel procedure is a contention-based random access channel procedure.

The measurement component 1445 may identify, based on the receiving, a highest random access channel UL receive power at the base station, the receive power associated with the first type of message from a UL transmit beam of the one or more UL transmit beams as part of the multiple transmissions.

Figure 15:
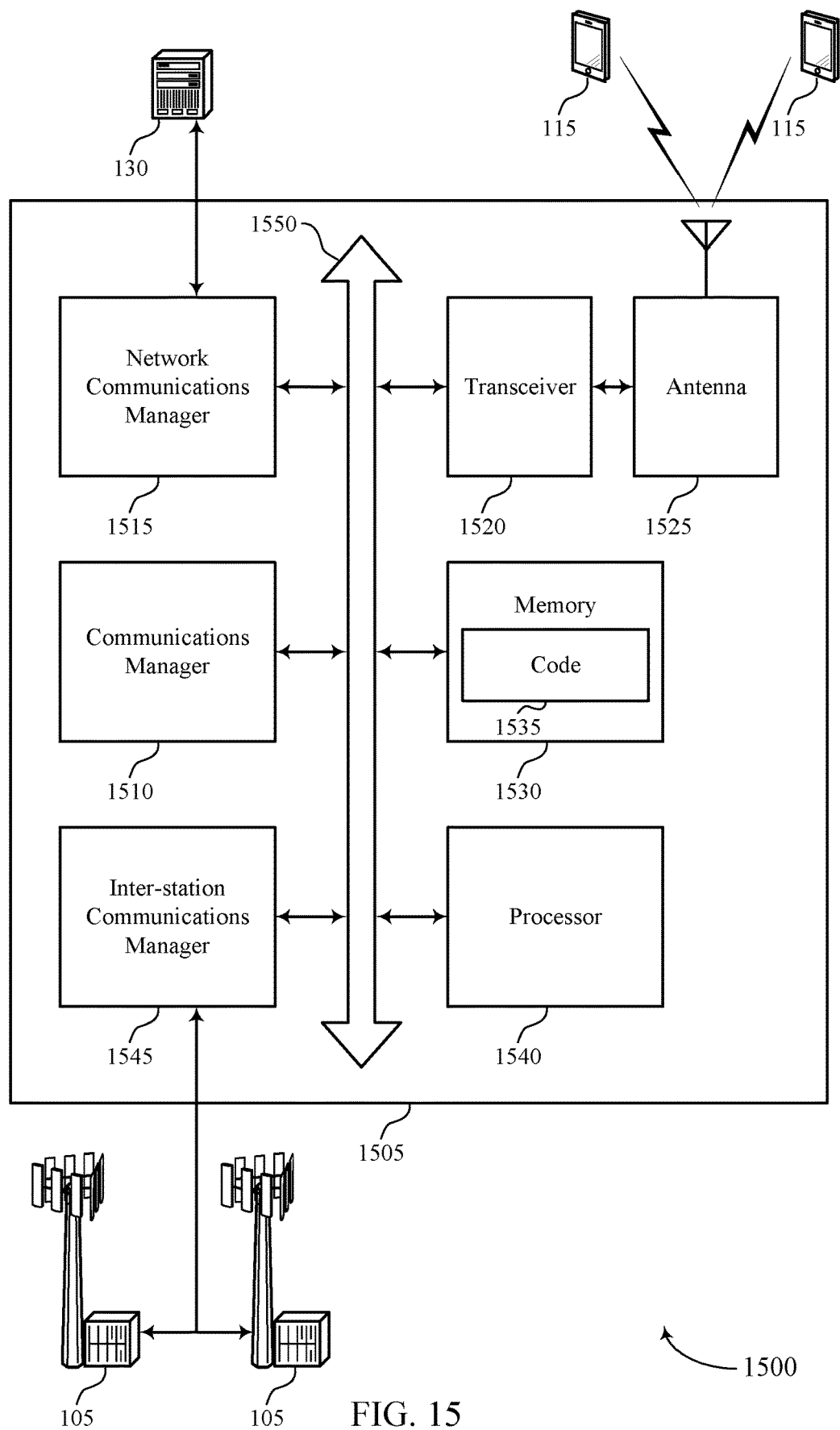
FIG. 15 shows a diagram of a system including a device that supports multiple msg1 for PDCCH ordered RACH in accordance with aspects of the present disclosure.

FIG. 15 shows a diagram of a system 1500 including a device 1505 that supports multiple Msg1 for PDCCH ordered RACH in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may determine a command for a UE to perform random access channel procedure, identify indicators of a configuration for multiple transmissions of a first type of random access channel message based on the determining, the indicators included in a physical downlink control channel order random access channel procedure, the indicators including time and frequency location information, procedure information, or a combination thereof for the multiple transmissions, and transmit the indicators to establish the configuration. The communications manager 1510 may also receive a first type of message for a random access channel procedure from one or more UL transmit beams of a UE as part of multiple transmissions during a random access response window, receive a transmission of the second type of message from the UE based on the transmitting, the second type of message associated with a lowest UL transmit power command included in the one or more responses, and transmit, to the UE, one or more random access channel responses based on the receiving, the one or more responses including an UL transmit power command for subsequent transmissions of a second type of message at the UE.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting multiple Msg1 for PDCCH ordered RACH).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

Figure 16:
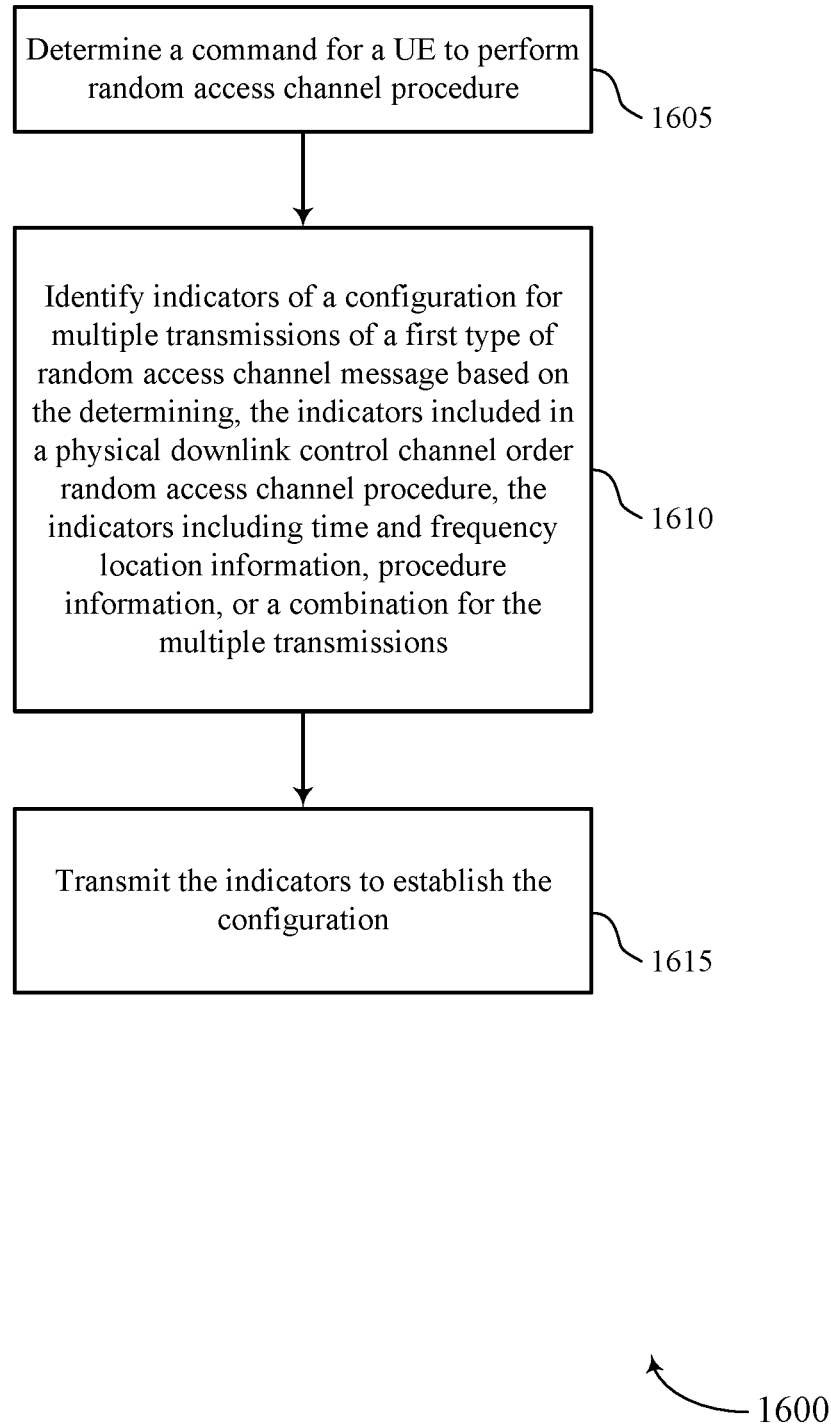
FIGS. 16 through 22 show flowcharts illustrating methods that support multiple msg1 for PDCCH ordered RACH in accordance with aspects of the present disclosure.

FIG. 16 shows a flowchart illustrating a method 1600 that supports multiple Msg1 for PDCCH ordered RACH in accordance with aspects of the present disclosure. The operations of method 1600 may be implemented by a base station 105 or its components as described herein. For example, the operations of method 1600 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1605, the base station may determine a command for a UE to perform random access channel procedure. The operations of 1605 may be performed according to the methods described herein. In some examples, aspects of the operations of 1605 may be performed by a command component as described with reference to FIGS. 12 through 15.

At 1610, the base station may identify indicators of a configuration for multiple transmissions of a first type of random access channel message based on the determining, the indicators included in a physical downlink control channel order random access channel procedure, the indicators including time and frequency location information, procedure information, or a combination thereof for the multiple transmissions. The operations of 1610 may be performed according to the methods described herein. In some examples, aspects of the operations of 1610 may be performed by a configuration component as described with reference to FIGS. 12 through 15.

At 1615, the base station may transmit the indicators to establish the configuration. The operations of 1615 may be performed according to the methods described herein. In some examples, aspects of the operations of 1615 may be performed by a control information component as described with reference to FIGS. 12 through 15.

Figure 17:
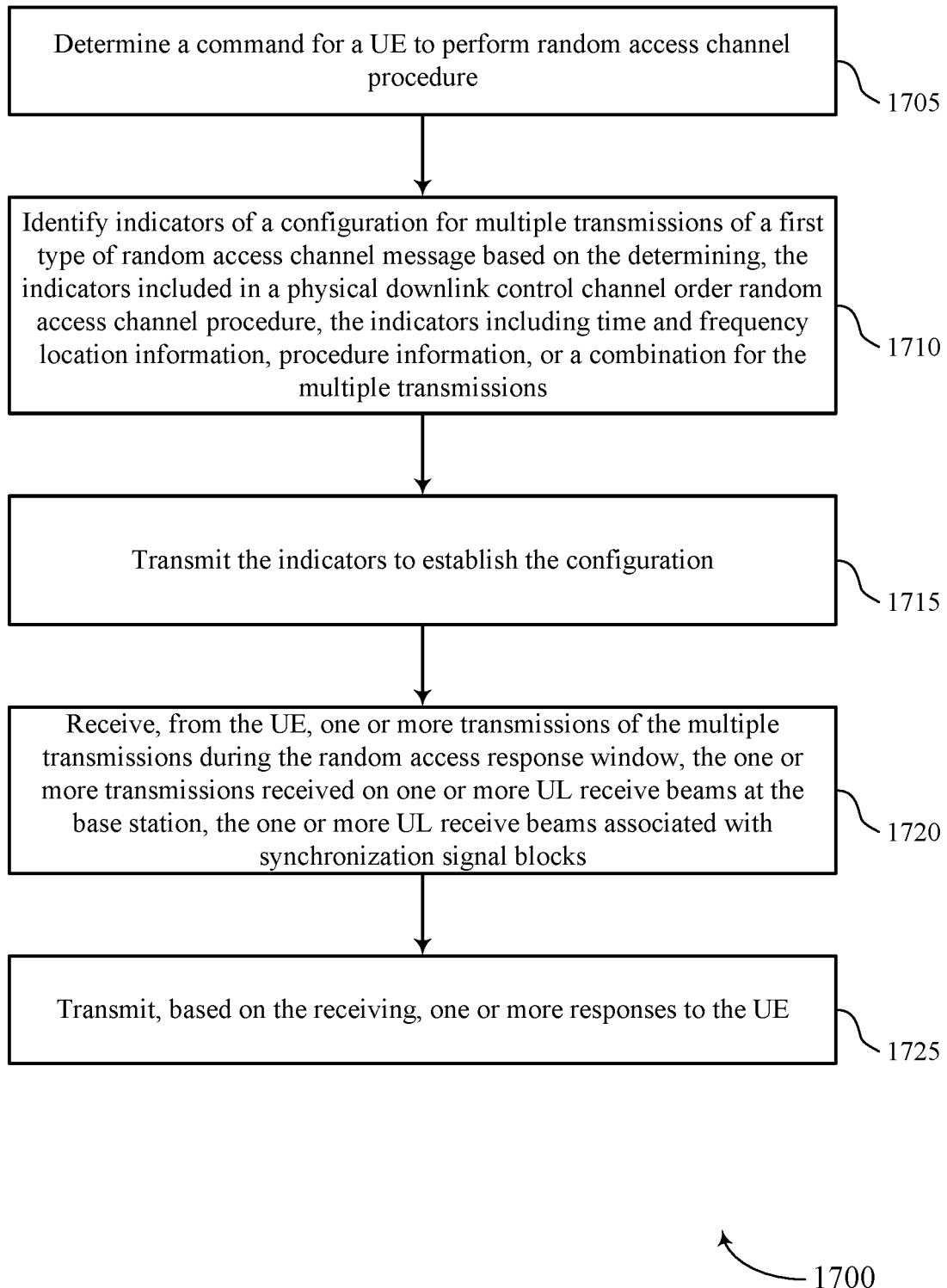

FIG. 17 shows a flowchart illustrating a method 1700 that supports multiple Msg1 for PDCCH ordered RACH in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1705, the base station may determine a command for a UE to perform random access channel procedure. The operations of 1705 may be performed according to the methods described herein. In some examples, aspects of the operations of 1705 may be performed by a command component as described with reference to FIGS. 12 through 15.

At 1710, the base station may identify indicators of a configuration for multiple transmissions of a first type of random access channel message based on the determining, the indicators included in a physical downlink control channel order random access channel procedure, the indicators including time and frequency location information, procedure information, or a combination thereof for the multiple transmissions. The operations of 1710 may be performed according to the methods described herein. In some examples, aspects of the operations of 1710 may be performed by a configuration component as described with reference to FIGS. 12 through 15.

At 1715, the base station may transmit the indicators to establish the configuration. The operations of 1715 may be performed according to the methods described herein. In some examples, aspects of the operations of 1715 may be performed by a control information component as described with reference to FIGS. 12 through 15.

At 1720, the base station may receive, from the UE, one or more transmissions of the multiple transmissions during the random access response window, the one or more transmissions received on one or more UL receive beams at the base station, the one or more UL receive beams associated with synchronization signal blocks. The operations of 1720 may be performed according to the methods described herein. In some examples, aspects of the operations of 1720 may be performed by a random access component as described with reference to FIGS. 12 through 15.

At 1725, the base station may transmit, based on the receiving, one or more responses to the UE. The operations of 1725 may be performed according to the methods described herein. In some examples, aspects of the operations of 1725 may be performed by a random access component as described with reference to FIGS. 12 through 15.

Figure 18:
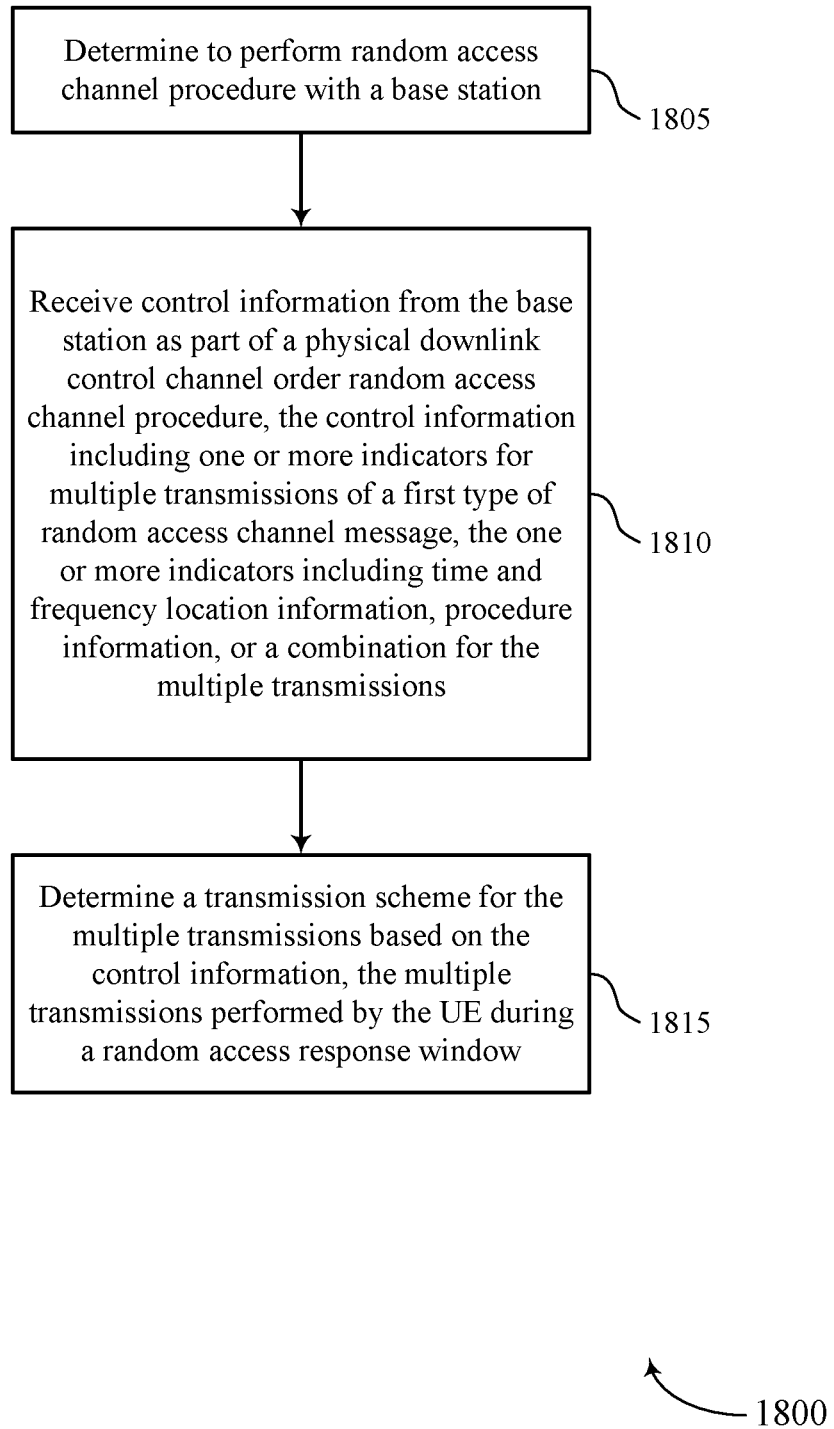

FIG. 18 shows a flowchart illustrating a method 1800 that supports multiple Msg1 for PDCCH ordered RACH in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may determine to perform random access channel procedure with a base station. The operations of 1805 may be performed according to the methods described herein. In some examples, aspects of the operations of 1805 may be performed by a command component as described with reference to FIGS. 8 through 11.

At 1810, the UE may receive control information from the base station as part of a physical downlink control channel order random access channel procedure, the control information including one or more indicators for multiple transmissions of a first type of random access channel message, the one or more indicators including time and frequency location information, procedure information, or a combination thereof for the multiple transmissions. The operations of 1810 may be performed according to the methods described herein. In some examples, aspects of the operations of 1810 may be performed by a control information component as described with reference to FIGS. 8 through 11.

At 1815, the UE may determine a transmission scheme for the multiple transmissions based on the control information, the multiple transmissions performed by the UE during a random access response window. The operations of 1815 may be performed according to the methods described herein. In some examples, aspects of the operations of 1815 may be performed by a configuration component as described with reference to FIGS. 8 through 11.

Figure 19:
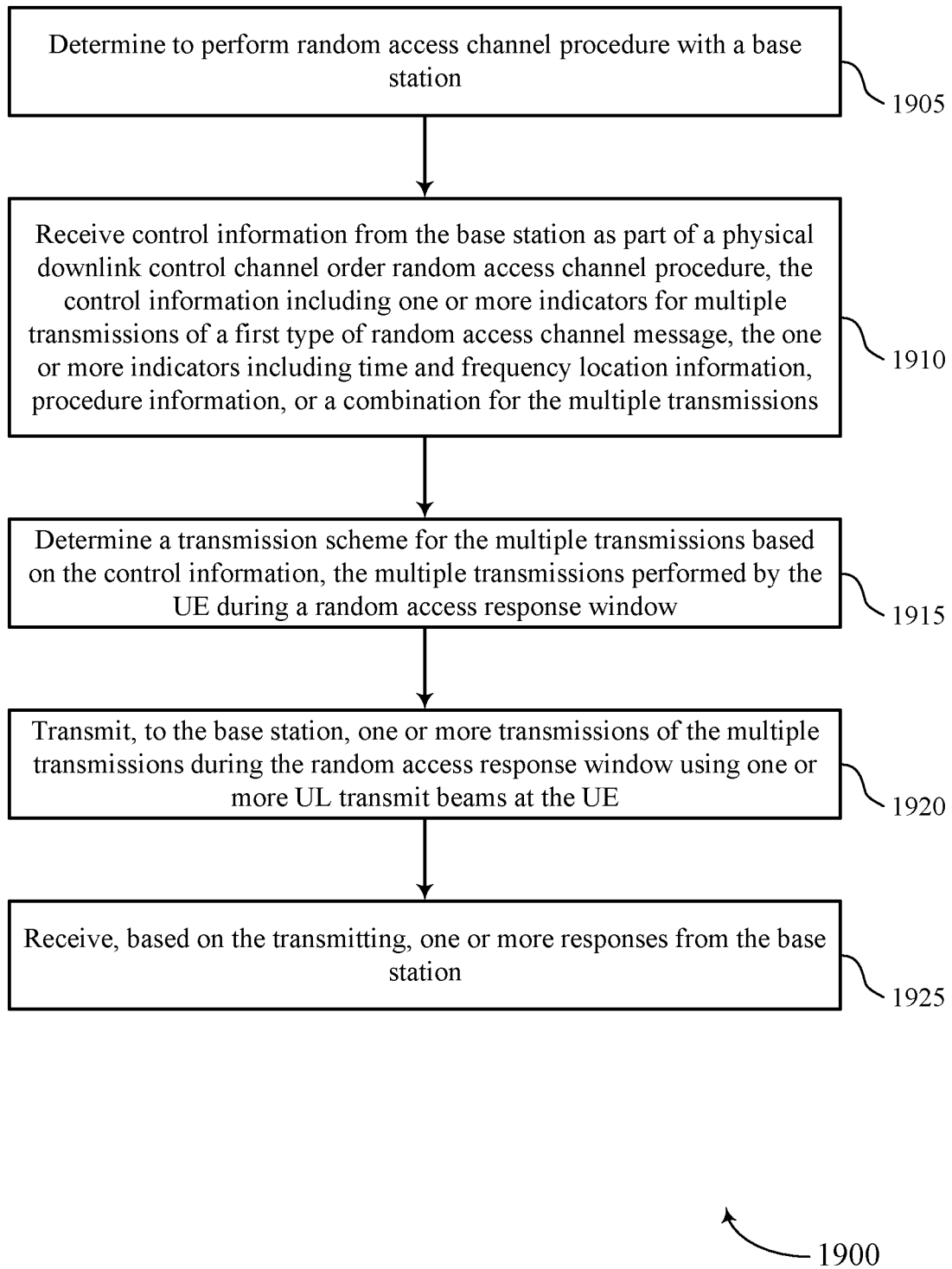

FIG. 19 shows a flowchart illustrating a method 1900 that supports multiple Msg1 for PDCCH ordered RACH in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may determine to perform random access channel procedure with a base station. The operations of 1905 may be performed according to the methods described herein. In some examples, aspects of the operations of 1905 may be performed by a command component as described with reference to FIGS. 8 through 11.

At 1910, the UE may receive control information from the base station as part of a physical downlink control channel order random access channel procedure, the control information including one or more indicators for multiple transmissions of a first type of random access channel message, the one or more indicators including time and frequency location information, procedure information, or a combination thereof for the multiple transmissions. The operations of 1910 may be performed according to the methods described herein. In some examples, aspects of the operations of 1910 may be performed by a control information component as described with reference to FIGS. 8 through 11.

At 1915, the UE may determine a transmission scheme for the multiple transmissions based on the control information, the multiple transmissions performed by the UE during a random access response window. The operations of 1915 may be performed according to the methods described herein. In some examples, aspects of the operations of 1915 may be performed by a configuration component as described with reference to FIGS. 8 through 11.

At 1920, the UE may transmit, to the base station, one or more transmissions of the multiple transmissions during the random access response window using one or more UL transmit beams at the UE. The operations of 1920 may be performed according to the methods described herein. In some examples, aspects of the operations of 1920 may be performed by a random access component as described with reference to FIGS. 8 through 11.

At 1925, the UE may receive, based on the transmitting, one or more responses from the base station. The operations of 1925 may be performed according to the methods described herein. In some examples, aspects of the operations of 1925 may be performed by a random access component as described with reference to FIGS. 8 through 11.

Figure 20:
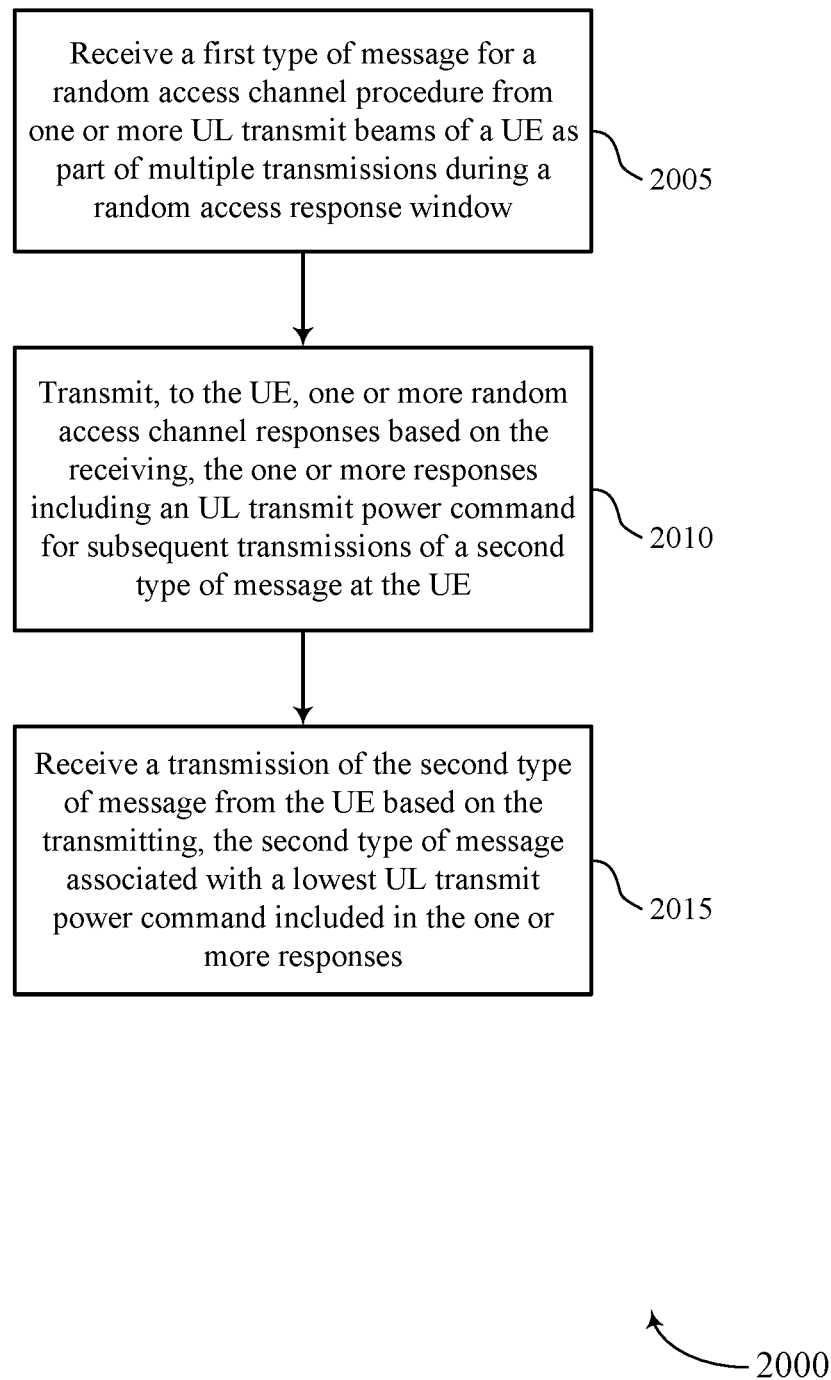

FIG. 20 shows a flowchart illustrating a method 2000 that supports multiple Msg1 for PDCCH ordered RACH in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may receive a first type of message for a random access channel procedure from one or more UL transmit beams of a UE as part of multiple transmissions during a random access response window. The operations of 2005 may be performed according to the methods described herein. In some examples, aspects of the operations of 2005 may be performed by a random access component as described with reference to FIGS. 12 through 15.

At 2010, the base station may transmit, to the UE, one or more random access channel responses based on the receiving, the one or more responses including an UL transmit power command for subsequent transmissions of a second type of message at the UE. The operations of 2010 may be performed according to the methods described herein. In some examples, aspects of the operations of 2010 may be performed by a control information component as described with reference to FIGS. 12 through 15.

At 2015, the base station may receive a transmission of the second type of message from the UE based on the transmitting, the second type of message associated with a lowest UL transmit power command included in the one or more responses. The operations of 2015 may be performed according to the methods described herein. In some examples, aspects of the operations of 2015 may be performed by a random access component as described with reference to FIGS. 12 through 15.

Figure 21:
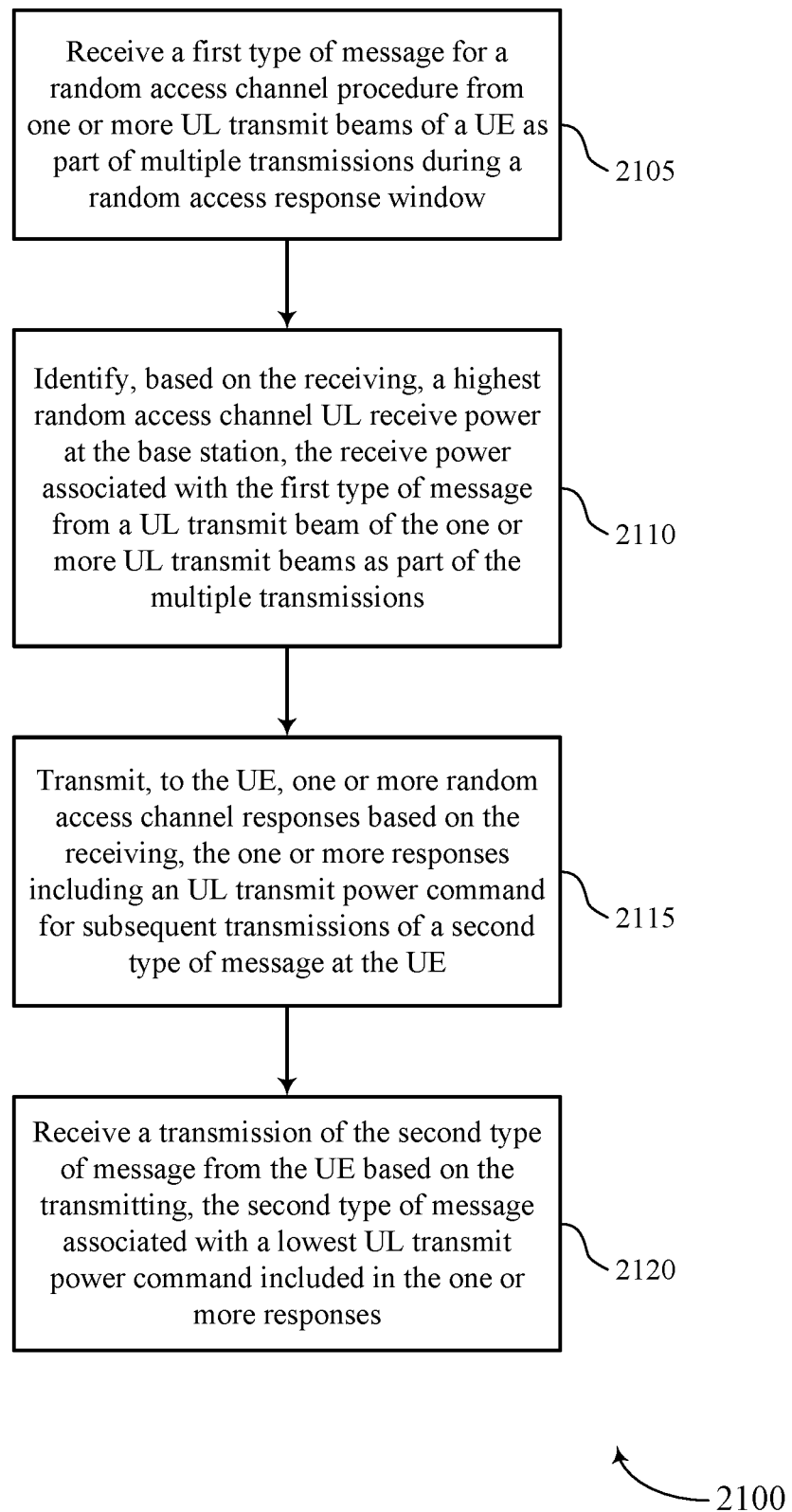

FIG. 21 shows a flowchart illustrating a method 2100 that supports multiple Msg1 for PDCCH ordered RACH in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may receive a first type of message for a random access channel procedure from one or more UL transmit beams of a UE as part of multiple transmissions during a random access response window. The operations of 2105 may be performed according to the methods described herein. In some examples, aspects of the operations of 2105 may be performed by a random access component as described with reference to FIGS. 12 through 15.

At 2110, the base station may identify, based on the receiving, a highest random access channel UL receive power at the base station, the receive power associated with the first type of message from a UL transmit beam of the one or more UL transmit beams as part of the multiple transmissions. The operations of 2110 may be performed according to the methods described herein. In some examples, aspects of the operations of 2110 may be performed by a measurement component as described with reference to FIGS. 12 through 15.

At 2115, the base station may transmit, to the UE, one or more random access channel responses based on the receiving, the one or more responses including an UL transmit power command for subsequent transmissions of a second type of message at the UE. The operations of 2115 may be performed according to the methods described herein. In some examples, aspects of the operations of 2115 may be performed by a control information component as described with reference to FIGS. 12 through 15.

At 2120, the base station may receive a transmission of the second type of message from the UE based on the transmitting, the second type of message associated with a lowest UL transmit power command included in the one or more responses. The operations of 2120 may be performed according to the methods described herein. In some examples, aspects of the operations of 2120 may be performed by a random access component as described with reference to FIGS. 12 through 15.

Figure 22:
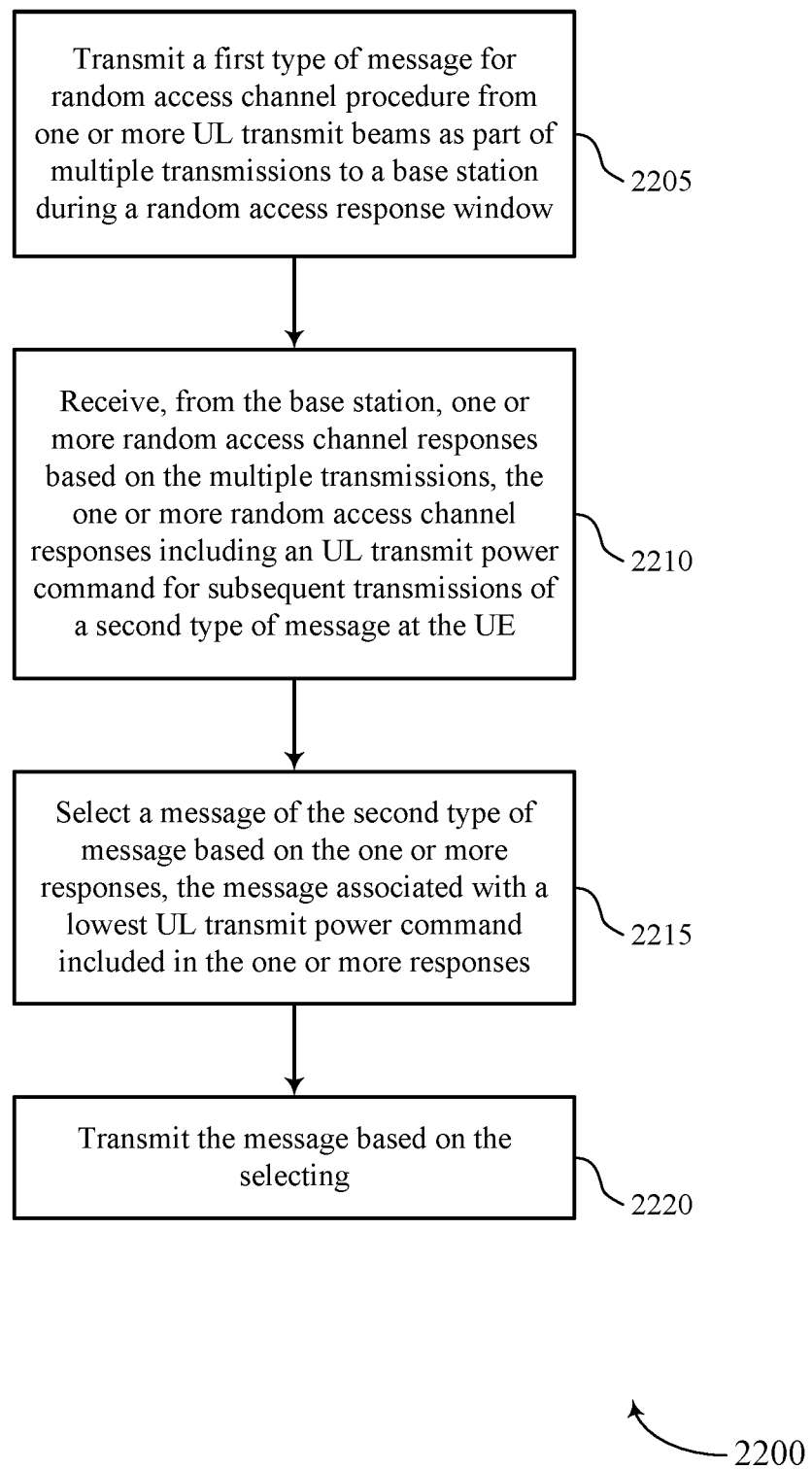

FIG. 22 shows a flowchart illustrating a method 2200 that supports multiple Msg1 for PDCCH ordered RACH in accordance with aspects of the present disclosure. The operations of method 2200 may be implemented by a UE 115 or its components as described herein. For example, the operations of method 2200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2205, the UE may transmit a first type of message for random access channel procedure from one or more UL transmit beams as part of multiple transmissions to a base station during a random access response window. The operations of 2205 may be performed according to the methods described herein. In some examples, aspects of the operations of 2205 may be performed by a random access component as described with reference to FIGS. 8 through 11.

At 2210, the UE may receive, from the base station, one or more random access channel responses based on the multiple transmissions, the one or more random access channel responses including an UL transmit power command for subsequent transmissions of a second type of message at the UE. The operations of 2210 may be performed according to the methods described herein. In some examples, aspects of the operations of 2210 may be performed by a control information component as described with reference to FIGS. 8 through 11.

At 2215, the UE may select a message of the second type of message based on the one or more responses, the message associated with a lowest UL transmit power command included in the one or more responses. The operations of 2215 may be performed according to the methods described herein. In some examples, aspects of the operations of 2215 may be performed by a selection component as described with reference to FIGS. 8 through 11.

At 2220, the UE may transmit the message based on the selecting. The operations of 2220 may be performed according to the methods described herein. In some examples, aspects of the operations of 2220 may be performed by a random access component as described with reference to FIGS. 8 through 11.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining to perform random access channel procedure with a base station;
   receiving control information from the base station as part of a physical downlink control channel order random access channel procedure, the control information including one or more indicators for multiple transmissions of a first type of random access channel message, the one or more indicators comprising time and frequency location information, procedure information, or a combination thereof for the multiple transmissions; and
   determining a transmission scheme for the multiple transmissions based at least in part on the control information, the multiple transmissions performed by the UE during a random access response window.

2. The method of claim 1, wherein the multiple transmissions of the first type of random access channel message comprise message 1 transmissions to the base station for the physical downlink control channel order random access channel procedure.

3. The method of claim 1, wherein determining the transmission scheme further comprises:
   determining a transmission scheme for a number of transmissions of the first type of random access channel message for performing the multiple transmissions.

4. The method of claim 3, wherein the multiple transmissions occur in a cyclic consecutive manner during random access channel occasions of the random access response window.

5. The method of claim 4, wherein the cyclic consecutive manner comprises message 1 transmissions from the UE in the same random access channel index during random access channel occasions of the random access response window, wherein the random access channel occasions correspond to consecutive random access channel occasions associated with the same synchronization signal block index or channel state information reference signal index.

6. The method of claim 1, wherein determining the transmission scheme further comprises:
   determining explicit locations for each transmission of the first type of random access channel message for performing the multiple transmissions during random access channel occasions of the random access response window.

7. The method of claim 1, further comprising:
   identifying a synchronization signal block index for performing the multiple transmissions based at least in part on processing the control information; and
   determining a preamble index and a relative random access channel occasion index within the random access channel occasions corresponding to the synchronization signal block index based at least in part on processing the control information.

8. The method of claim 1, wherein the control information is received as part of downlink control information contents of the physical downlink control channel order, control information included in a medium access control-control element, data included in radio resource control messaging, or a combination thereof.

9. The method of claim 1, wherein receiving the control information further comprises:
   receiving an indication for implementing one or more uplink (UL) transmit beams as part of an UL transmit beam sweep for the multiple transmissions; and
   determining the one or more UL transmit beams based at least in part on the indication.

10. The method of claim 1, wherein receiving the control information further comprises:
    receiving an indication via the physical downlink control channel order for performing the multiple transmissions in association with one or more control beams supported by the base station, the one or more control beams associated with different control resource sets and having different timing advance groups.

11. The method of claim 1, further comprising:
    transmitting, to the base station, one or more transmissions of the multiple transmissions during the random access response window using one or more uplink (UL) transmit beams at the UE; and
    receiving, based at least in part on the transmitting, one or more responses from the base station.

12. The method of claim 11, wherein the one or more responses from the base station comprise random access channel responses for the physical downlink control channel order random access channel procedure.

13. The method of claim 11, wherein the one or more responses each include an UL transmit power command for subsequent transmission of a second type of message at the UE.

14. The method of claim 13, wherein the transmission of the second type of message comprises a schedule for a message 3 transmission to the base station for the physical downlink control channel order random access channel procedure.

15. The method of claim 1, further comprising:
determining one or more synchronization signal blocks that the UE can detect simultaneously on a downlink (DL) receive beam at the UE; and
transmitting, based at least in part on the determining, the multiple transmissions during random access channel occasions of the random access response window, the random access channel occasions corresponding to indices of the one or more synchronization signal blocks.

16. The method of claim 1, further comprising:
receiving, from the base station, an interleaving pattern within the random access response window for random access channel occasions corresponding to one or more synchronization signal block indices; and
transmitting, based at least in part on the interleaving pattern, the multiple transmissions during the random access channel occasions, the multiple transmissions corresponding to one or more synchronization signal blocks or channel state information reference signals.

17. The method of claim 1, wherein the UE supports beam correspondence.

18. An apparatus for wireless communication at a user equipment (UE), comprising:
a processor,
memory in electronic communication with the processor; and
instructions stored in the memory and executable by the processor to cause the apparatus to:
determine to perform random access channel procedure with a base station;
receive control information from the base station as part of a physical downlink control channel order random access channel procedure, the control information including one or more indicators for multiple transmissions of a first type of random access channel message, the one or more indicators comprising time and frequency location information, procedure information, or a combination thereof for the multiple transmissions; and
determine a transmission scheme for the multiple transmissions based at least in part on the control information, the multiple transmissions performed by the UE during a random access response window.

* * * * *